US012811803B2

(12) United States Patent
Tamiya et al.

(10) Patent No.: US 12,811,803 B2
(45) Date of Patent: Nov. 24, 2026

(54) DIGITAL SIGNATURE SYSTEM

(71) Applicant: NEC Corporation, Tokyo (JP)

(72) Inventors: Hiroto Tamiya, Tokyo (JP); Saki Otsuki, Tokyo (JP); Haruna Fukuda, Tokyo (JP); Toshiyuki Isshiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 62 days.

(21) Appl. No.: 18/956,182

(22) Filed: Nov. 22, 2024

(65) Prior Publication Data

US 2025/0193021 A1 Jun. 12, 2025

(30) Foreign Application Priority Data

Dec. 7, 2023 (JP) ................................ 2023-206988

(51) Int. Cl.
*H04L 9/32* (2006.01)

(52) U.S. Cl.
CPC .......... *H04L 9/3247* (2013.01); *H04L 9/3231* (2013.01)

(58) Field of Classification Search
CPC ..... H04L 9/3247; H04L 9/3231; H04L 9/008; H04L 9/0866; H04L 9/3066; H04L 9/3252
See application file for complete search history.

(56) References Cited

U.S. PATENT DOCUMENTS

| | | | | |
|---|---|---|---|---|
| 8,775,809 | B2 * | 7/2014 | Tuyls | H04L 9/3231 713/172 |
| 10,057,068 | B2 * | 8/2018 | Takahashi | H04L 9/0866 |
| 2007/0266234 | A1 | 11/2007 | Inami | |
| 2009/0240950 | A1 | 9/2009 | Suzuki et al. | |
| 2016/0094348 | A1 | 3/2016 | Takahashi | |

(Continued)

FOREIGN PATENT DOCUMENTS

| | | | |
|---|---|---|---|
| JP | 2000-138670 | A | 5/2000 |
| JP | 2005-045622 | A | 2/2005 |
| JP | 2007-306365 | A | 11/2007 |

(Continued)

OTHER PUBLICATIONS

Lindell, Yehuda. "Fast secure two-party ECDSA signing." Advances in Cryptology-CRYPTO 2017: 37th Annual International Cryptology Conference, Santa Barbara, CA, USA, Aug. 20-24, 2017, Proceedings, Part II 37. Springer International Publishing, 2017.

(Continued)

*Primary Examiner* — Baotran N To

(57) ABSTRACT

A first signature generation apparatus receives and registers first auxiliary data generated based on a first signature key and first biometric information and a second signature generation apparatus acquires second biometric information, generates a second distributed key, generates second auxiliary data using the second biometric information and the second distributed key and transmits a message and the second auxiliary data to the first signature generation apparatus, which generates a first distributed key using the first auxiliary data and the second auxiliary data, wherein the first and second signature generation apparatuses execute a distributed signing process using at least the first and second distributed keys to generate a signature for the message.

17 Claims, 10 Drawing Sheets

(56) References Cited

U.S. PATENT DOCUMENTS

| | | | |
|---|---|---|---|
| 2022/0405369 | A1 | 12/2022 | Takahashi |

FOREIGN PATENT DOCUMENTS

| | | | |
|---|---|---|---|
| JP | 5707311 | B2 | 4/2015 |
| JP | 16096893 | B2 | 3/2017 |
| JP | 2021-087167 | A | 6/2021 |
| WO | 2008/035413 | A1 | 3/2008 |

OTHER PUBLICATIONS

Dodis, Yevgeniy, Ostrovsky Rafail, Reyzin, Leonid and Smith, Adam. "Fuzzy Extractors: How to Generate Strong Keys from Biometrics and Other Noisy Data.", EUROCRYPT 2004.

Nicolosi, Antonio, et al. "Proactive Two-Party Signatures for User Authentication."

Derler, David and Slamanig, Daniel. "Key-homomorphic signatures: definitions and applications to multiparty signatures and non-interactive zero-knowledge." Designs, Codes and Cryptography, vol. 87.

* cited by examiner

DIGITAL SIGNATURE SYSTEM

CROSS REFERENCE TO RELATED APPLICATIONS

This application is based upon and claims the benefit of the priority of Japanese patent application No. 2023-206988, filed on Dec. 7, 2023, the disclosure of which is incorporated herein in its entirety by reference thereto.

FIELD

The present disclosure relates to a digital signature system, method and non-transitory medium.

BACKGROUND

Digital signature is a technology which enables to verify a creator of an electronic document and check that the document has not been altered after creation thereof.

<Algorithm of Digital Signature>

The following outlines one of typical algorithms of digital signature.

Key Generation:

A key generation algorithm KeyGen( ) generates a pair of a signing key (secret key) sk and a verification key (public key) vk.

$$(sk, vk) \leftarrow KeyGEn(1^{\kappa}) \tag{1}$$

where κ is a security parameter.

The key generation algorithm Key Gen( ) may not directly take as input a security parameter, but to take as input public parameters which a setup algorithm has generated from the security parameter, and generate a pair of the signing key (secret key) sk and the verification key (public key) vk.

Signing:

A signing algorithm Sign( ) generates a signature σ for a message (document) M with the signing key sk. That is, the signature σ is generated, using the signing key (secret key) sk for the message (document) M to be signed or a hash value (message digest) which is obtained as an output of a hash function which takes as input the message M.

$$\sigma \leftarrow \mathrm{Sign}(sk, M) \tag{2}$$

Verification:

A verification algorithm Verify( ) verifies the signature σ for the message (document) M (i.e., verifies correctness of the message (document) M and the signature σ) using the verification key vk.

$$0/1 \leftarrow \mathrm{Verify}(vk, M, \sigma) \tag{3}$$

where Verify( ) is assumed to return(output) 1 for acceptance and return(output) 0 for non-acceptance (rejection), though not limited thereto.

In digital signature, when a public key is made public, those who obtain a document and a signature can perform verification of the signature for the document (message). That is, using a verification key, which is a public key, it is possible to verify whether or not the signature has been generated for the document (message) with the signing key.

Digital signatures may be used for a variety of applications, such a s e-mail protection (S/MIME (Secure/Multipurpose Internet Mail Extensions)) and electronic contracts. For example, a digital signature of a contractor is electronically attached to electronic contract data in place of a seal in a written contract. In a case of virtual currency remittance, a message which includes information on "to which address and how much to remit" and a sender's digital signature for the message may be recorded in a blockchain. The remittance process may be completed when the signature is successfully verified.

In digital signature, when a signing key is lost or stolen, security could be compromised. It is difficult for a user to properly manage a signing key. When a signing key is not properly managed, there is a risk that the signing key may be lost or stolen. Improper management of a signing key may lead to preventing a "signer" to generate a correct signature (e.g., when the signing key is lost) or allowing someone other than a "signer" to generate a correct signature (e.g., when the signing key is stolen).

Security for digital signature is based on that a signing key is managed to be kept in secret. An adversary, once obtaining a signing key, can generate a correct signature. That is, what digital signature guarantees is that "a person with a signing key has given a signature to a document," not that "a 'signer' has given a signature to a document. The larger the number of keys a user has to manage, the more difficult becomes management thereof. As for a digital signature scheme in which keys are managed in a distributed manner, such as a multi-signature scheme, reference may be made to Reference Literature 1, etc.

A digital signature using biometric information has been proposed, for example, as a biometric signature (fuzzy signature) (e.g., Patent Literature (PTL) 1). In a biometric signature system of PTL 1, an enrollment terminal generates an enrollment commitment in which biometric information is embedded in a secret key, and a signature generation terminal receives a message, generates a temporary secret key and a temporary public key, generates a signature commitment in which biometric information is embedded in the temporary secret key, and sends a biometric signature including a digital signature for the message generated using the temporary secret key, the signature commitment and the temporary public key to a verification apparatus, which receives the message and verifies whether the digital signature included in the biometric signature is a correct signature for the message using the temporary public key, and verifies validity of a set of the enrollment commitment and the signature commitment using the public key and the temporary public key.

PTL 1: Japanese Patent No. 5707311

SUMMARY

In a digital signature system using biometric information, a risk of losing a key (e.g., secret key) may be reduced as compared with a digital signature system using a key. However, in the signature system using biometric information, biometric information, once compromised, since it is difficult to change or replace, would no longer ensure secure use of a key generated from the relevant biometric information.

It is an object of the present disclosure to provide a system, method, and a non-transitory medium, each enabling to mitigate risk simultaneously for key loss and compromise in digital signature.

According to an aspect of the present disclosure, a digital signature system includes a first signature generation apparatus and a second signature generation apparatus, each including at least a processor, a memory storing program instructions executable by the processor and a communication interface and communicatively connecting to each other.

The first signature generation apparatus is configured to receive first auxiliary data generated based on a first signature key and first biometric information to store the first auxiliary data in a storage.

The second signature generation apparatus is configured to:

acquire second biometric information;

generate a second distributed key;

acquire a message to be signed;

generate second auxiliary data using the second biometric information and the second distributed key; and transmit the message and the second auxiliary data to the first signature generation apparatus.

The first signature generation apparatus configured to on reception of the second auxiliary data, generate a first distributed key using the first auxiliary data and the second auxiliary data. and The first signature generation apparatus and the second signature generation apparatus are configured to perform a distributed signing process using at least the first distributed key and the second distributed key to generate a signature for the message.

According to an aspect of the present disclosure a method including:

a first node receiving first auxiliary data generated based on a first signature key and first biometric information and storing the first auxiliary data in a storage;

a second node that communicatively connects to the first node, acquiring second biometric information;

generating a second distributed key;

acquiring a message to be signed;

generating second auxiliary data using the second biometric information and the second distributed key; and transmitting the message and the second auxiliary data to the first node, the first node generating a first distributed key using the first auxiliary data and the second auxiliary data; and the first node and the second node executing a distributed signing process using at least the first distributed key and the second distributed key to generate a signature for the message.

Further, as a recording medium includes a program(s) to cause a first processing apparatus and a second processing apparatus to execute processing comprising:

receiving and storing in a storage, first auxiliary data generated using the first signing key and the first biometric information, by the first processing apparatus;

acquiring second biometric information, generating a second distributed key, acquiring a message to be signed, generating second auxiliary data using the second biometric information and the second distributed key, and transmitting the message and the second auxiliary data to the first processing apparatus, by the second processing apparatus;

generating a first distributed key using the first auxiliary data and the second auxiliary data, by the first processing apparatus; and generating a signature for the message by executing a two-party distributed signing process using at least the first distributed key and the second distributed key, respectively, by the first processing apparatus and the second processing apparatus that communicatively connect to each other.

According to the present disclosure, it is possible mitigate risk simultaneously for key loss and compromise in digital signature.

EXAMPLE EMBODIMENTS

Figure 1:
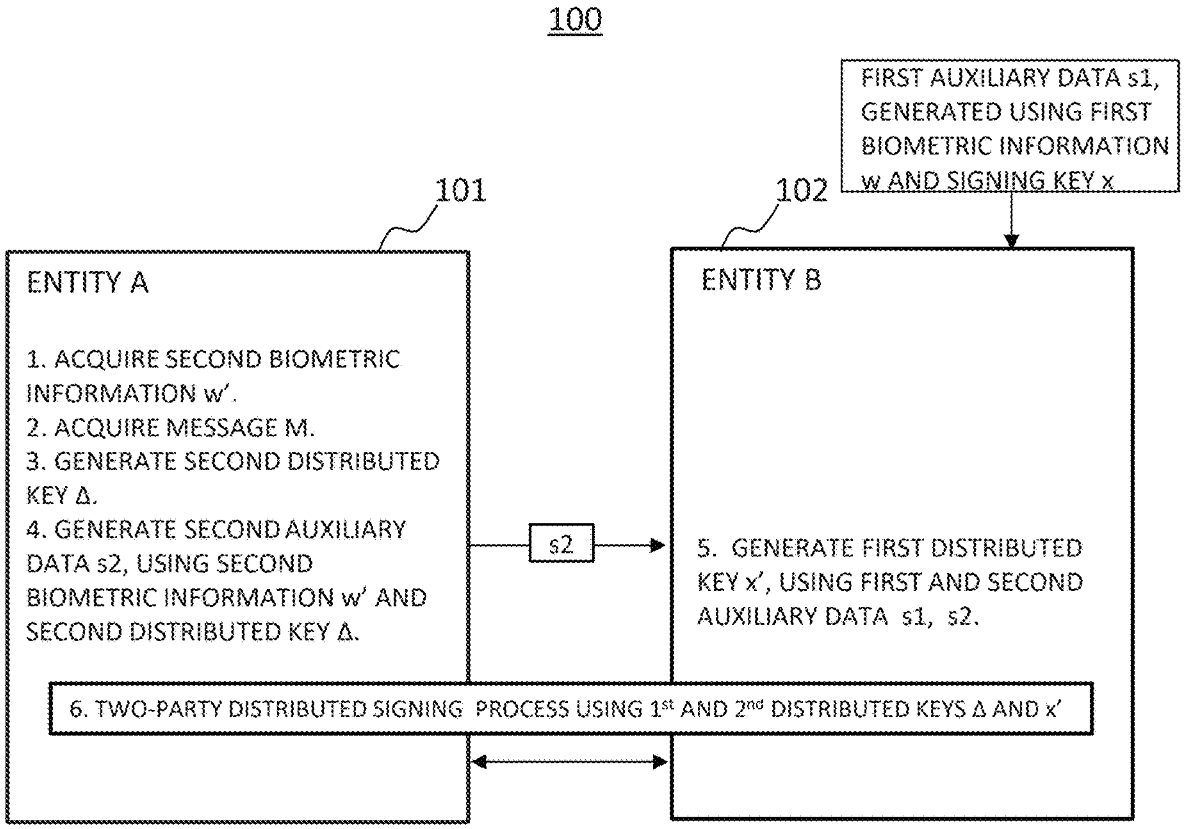
FIG. 1 is a schematic diagram illustrating an example system of the present disclosure.

The following describes example embodiments of the present disclosure. FIG. 1 is a schematic diagram illustrating an example system of the present disclosure. Referring to FIG. 1, an entity A 101 and an entity B 102 are each configured to include at least a processor and a communication interface and communicatively connect to each other. The entity A 101/entity B 102 may be respectively configured or referred to as a second processor/first processor, a second signature generation apparatus/first signature generation apparatus, or a second node/first node. This is because the entity A 101/entity B 102 handles a second distribution key/first distribution key and second auxiliary data/first auxiliary data, respectively.

Referring to FIG. 1, the entity A101 (second signature generation apparatus) performs the following process in a signing phase:

acquiring second biometric data w' (Step 1);

acquiring a message M to be signed (Step 2);

generating a second distributed key Δ (Step 3); and generating second auxiliary data s2 using the second distributed key Δ and the second biometric information w' and transmits the second auxiliary data s2 to entity B102 (first apparatus) (Step 4).

In the second auxiliary data s2, information obtained by encoding the second distributed key Δ is embedded in the second biometric information w' (biometric information for signing). Thus, a possibility that the second biometric information w' is forged from the second auxiliary data s2 is sufficiently low to ensure security.

The entity B102 (first signature generation apparatus) receives first auxiliary data s1 and stores the first auxiliary data s1 in a storage before the signing phase. The first auxiliary data s1 is generated using a first signing key (secret key) x and first biometric information w (biometric information for enrollment). In the first auxiliary data s1, information obtained by encoding the first signing key x is embedded in the first biometric information w. Thus, the possibility that the first biometric information w is forged from the first auxiliary data s1 is sufficiently low to ensure security. The first auxiliary data s1 and the second auxiliary data s2 generated based on the first biometric information w and the second biometric information w', respectively, are not transmitted as they are to a verifier (verification destination), nor registered in a public ledger on a blockchain.

The entity B102 receives the second auxiliary data s2 from the entity A101. Using the first auxiliary data s1 retained in the storage and the second auxiliary data s2 received, the entity B102 generates a first distributed key x' with an error correcting capability and linearity of coding (Step 5). When the first biometric information w and the second biometric information w' are biometric information of the same person, the first distributed key x' which is reconstructed by a reconstruction process, is given as $$x' = x - \Delta \quad \text{(4a)}$$

The first signing key x is additively decomposed (distributed) to the second distributed key Δ and the first distributed key x'.

$$x = \Delta + x' \quad \text{(4b)}$$

The entity A101 and entity B102 perform a two-party distributed signing process using the second distributed key Δ and the first distributed key x' to generate a signature σ for a message M (Step 6). This signature σ is a signature for the message M, which is able to be verified with a verification key v corresponding to the first signing key x. As a signature scheme, an Elliptic Curve Digital Signature Algorithm (ECDSA) scheme, a Schnorr signature scheme or the like may be used.

Figure 2:
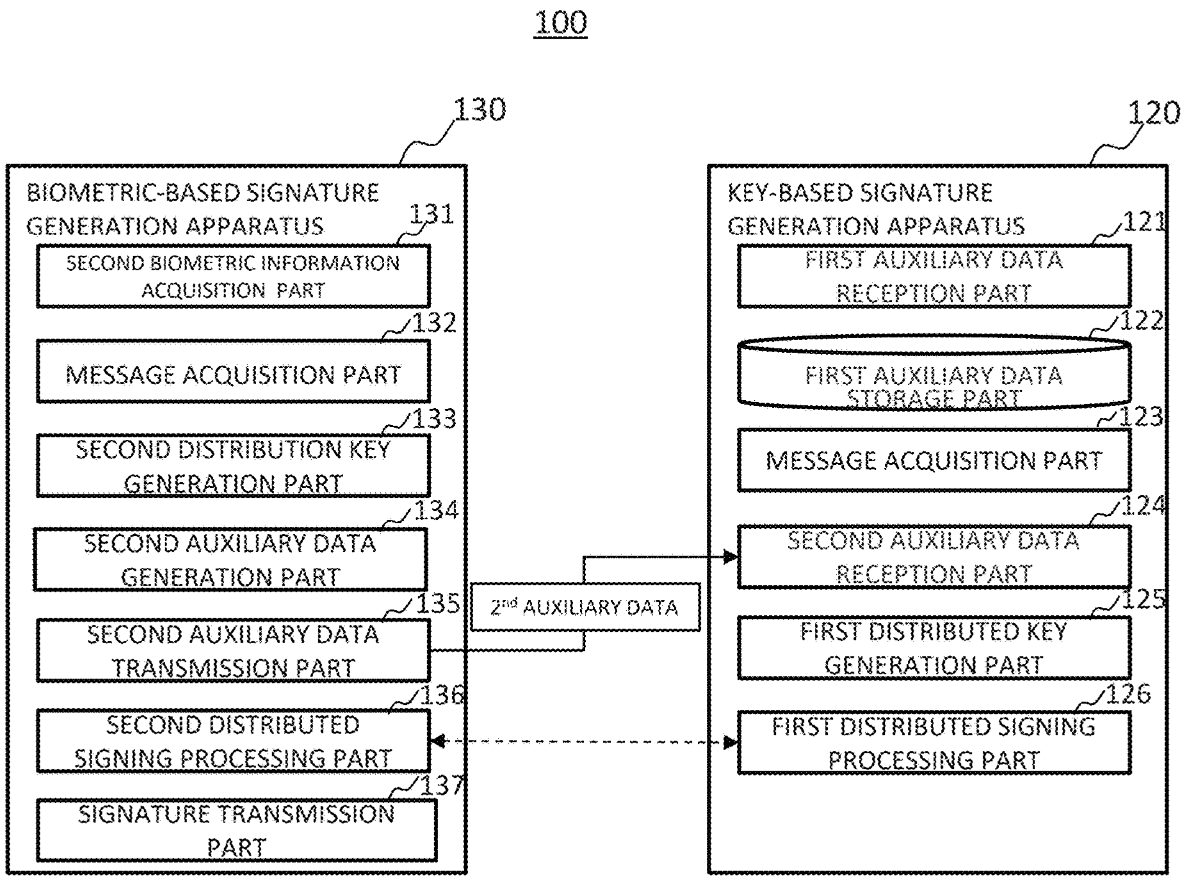
FIG. 2 is a schematic diagram illustrating a configuration example of a system of the present disclosure.

FIG. 2 illustrates an example of a configuration of entities A101 and B102 in FIG. 1. In FIG. 2, entity A101 of FIG. 1 is configured by a biometric-based (biometric-using) signature generation apparatus 130 and entity B102 is configured by a key-based (key-using) signature generation apparatus 120. The biometric-based signature generation apparatus 130 and the key-based signature generation apparatus 120 may be referred to as a second signature generation apparatus and a first signature generation apparatus, respectively. Referring to FIG. 2, the biometric-based signature generation apparatus 130 includes a second biometric information acquisition part 131 equipped with a sensor not shown or the like that acquires the second biometric information w', a message acquisition part 132 that acquires a message M to be signed, a second distributed key generation part 133 that generate a second distributed key (key for distributed signature) Δ, a second auxiliary data generation part 134 that generates second auxiliary data s2 using the second biometric information w' and the second distributed key, a second auxiliary data transmission part 135 that transmits the second auxiliary data s2 to the key-based signature generation apparatus 120, a second distributed signing processing part 136 that performs a distributed signing process in cooperation with the biometric-based signature generation apparatus 130, and a signature transmission part 137 that outputs a generated signature σ to a verifier not shown.

The key-based signature generation apparatus 120 includes a first auxiliary data reception part 121 that receives first auxiliary data s1 generated using the first biometric information w and the first signing key x, a first auxiliary data storage part 122 that stores the first auxiliary data received, a message acquisition part 123 that acquires the message M to be signed, a second auxiliary data reception part 124 that receives the second auxiliary data s2 transmitted from the biometric-based signature generation apparatus 130, a first distributed key generation part 125 that generates a first distributed key x' using the first auxiliary data s1 and the second auxiliary data s2, and a first distributed signing processing part 126 that performs a distributed signing process in cooperation with the biometric-based signature generation apparatus 130. The message acquisition part 123 may receive the message M sent from the biometric-based signature generation apparatus 130. The second distributed signing processing part 136 of the biometric-based signature generation apparatus 130 may transmit the message M to the message acquisition part 123 of the key-based signature generation apparatus 120.

Figure 3:
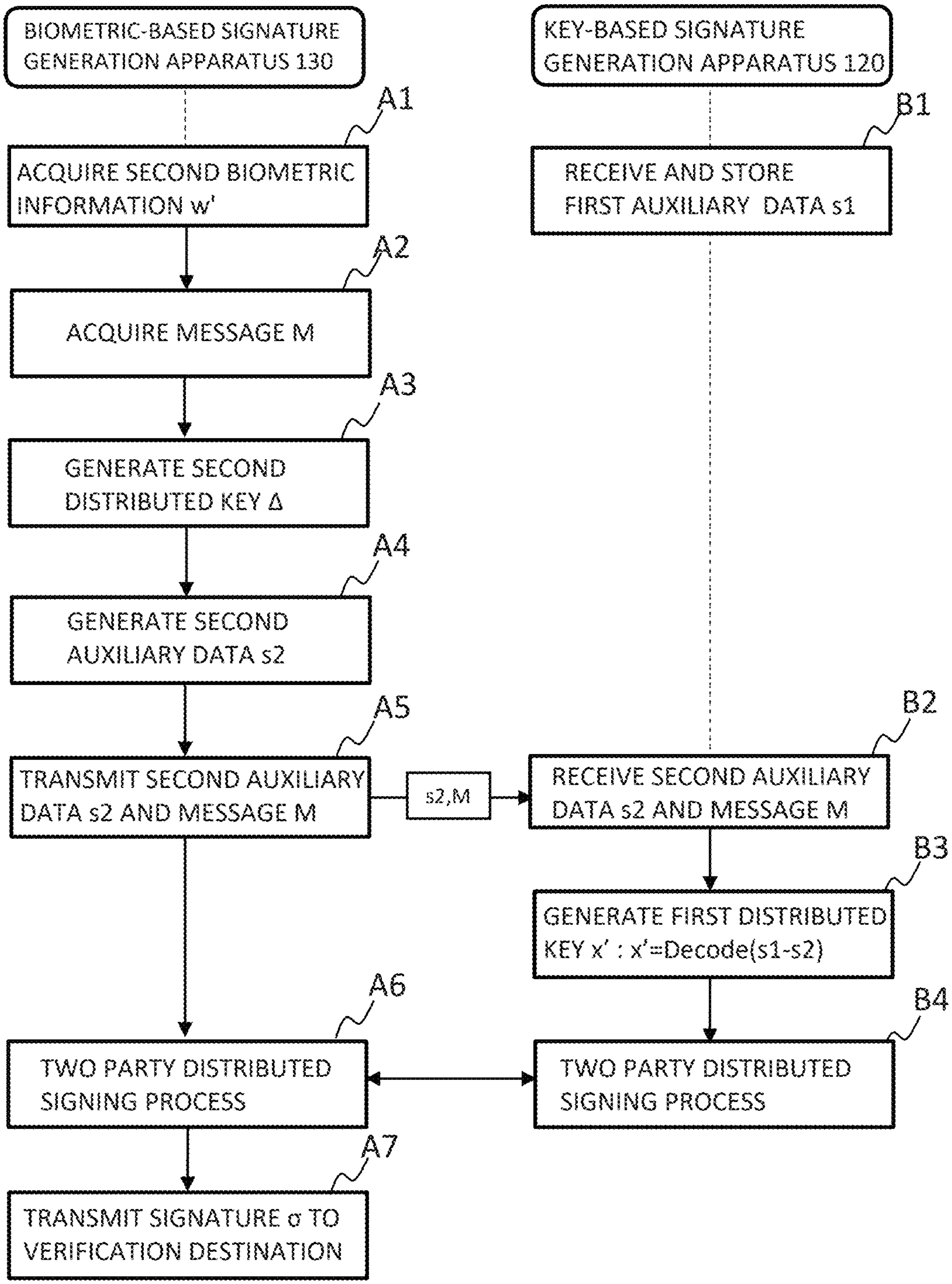
FIG. 3 is a schematic diagram illustrating a process flow of a basic system of the present disclosure.

FIG. 3 illustrates a process flow example of the biometric-based signature generation apparatus 130 and the key-based signature generation apparatus 120 in FIG. 2.

In the biometric-based signature generation apparatus 130, the second biometric information acquisition part 131 acquires the second biometric information w' (Step A1). The message acquisition part 132 acquires a message M to be signed (Step A2). The second distributed key generation part 133 generates the second distributed key Δ uniformly at random (Step A3).

The second auxiliary data generation part 134 composites an encoded key c (=Encode(Δ)), which is obtained by applying an encoding function (Encode) to the second distribution key Δ, and the second biometric information w' to generate the second auxiliary data s2 (Step A4).

$$s2 = c + w' \quad \text{(5)}$$

The second auxiliary data s2 may be also termed a second Key parameter.

The operation "+" in Equation (5) may be −, or it may be a bitwise exclusive OR operator, etc., depending on the coding.

The encoding function Encode converts a plaintext m in an information source space to a code c. A decoding function Decode converts the code c back to the plaintext m.

$$c \leftarrow \text{Encode}(m) \quad \text{(6)}$$

$$m \leftarrow \text{Decode}(c) \quad \text{(7)}$$

Here, the following equation must hold for a code c' whose difference from c is within a correction range, where c is a code of any plaintext m in an information source space.

$$m = \text{Decode}(c') \quad \text{(8)}$$

As will be described below, in one or more example embodiments, a linear code is used, which has linearity with respect to a code.

Linearity:

$$\mathrm{Encode}(m1)+\mathrm{Encode}(m2) \quad (9)$$

is a codeword for m1+m2. Therefore, the following equation holds.

$$m1+m2=\mathrm{Decode}(\mathrm{Encode}(m1)+\mathrm{Encode}(m2)) \quad (10)$$

In Equation (10), "+" on the left and right sides need not be the same operation.

With respect to coding, a linear error-correcting code (Hamming code, BCH (Bose-Chaudhuri-Hocquenghem) code, RS (Reed-Solomon) code, LDPC (low-density parity-check code), etc.) may be used. Alternatively, a lattice coding may be used. Coding methods using integer lattices, triangular lattices, and more complex lattices are known (see PTL 5, etc.).

The second auxiliary data transmission part 135 of the biometric-based signature generation apparatus 130 transmits the second auxiliary data s2 (=Encode(Δ)+w') to the key-based signature generation apparatus 120. The key-based signature generation apparatus 120 and the biometric-based signature generation apparatus 130 may be configured to communicatively connect via a network (e.g., at least one of a wired LAN, wireless LAN, WAN, a mobile communication network, a virtual network, etc.).

In the key-based signature generation apparatus 120, the first auxiliary data reception part 121 receives the first auxiliary data s1 and stores it in the first auxiliary data storage part 122 (Step B1). The first auxiliary data s1 is composited by the first signing key x and the first biometric information w and is given, for example, as follows.

$$s1=\mathrm{Encode}(x)+w \quad (11)$$

It is noted that s1 and s2 may be associated with a secure sketch of Reference Literature 2.

The second auxiliary data reception part 124 of the key-based signature generation apparatus 120 receives the second auxiliary data s2 transmitted from the biometric-based signature generation apparatus 130, and the message acquisition part 123 receives a message transmitted from the biometric-based signature generation apparatus 130 (Step B2). The biometric-based signature generation apparatus 130 may transmit the second auxiliary data s2 and the message M together or individually to the key-based signature generation apparatus 120. The first distributed key generation part 125 of the key-based signature generation apparatus 120 reads the first auxiliary data s1 stored in the first auxiliary data storage part 122 and supplies a difference (s1−s2) between the first auxiliary data s1 and the second auxiliary data s2 to a decoding function Decode, which reconstructs the first distributed key x' (Step B3).

$$x'=\mathrm{Decode}(s1-s2) \quad (12)$$

The right-hand side of Equation (12) can be expanded as follows $$\mathrm{Decode}(s1-s2)=\mathrm{Decode}(\mathrm{Encode}(x)+w-(\mathrm{Encode}(\Delta)+w'))=\mathrm{Decode}(\mathrm{Encode}(x-\Delta)+(w-w'))$$

When (w−w') is within an error correction range, the following holds.

$$x'=x-\Delta \quad (13)$$

Instead of supplying the difference (s1−s2) between the first auxiliary data s1 and the second auxiliary data s2 as an arguments to the decoding function Decode, using a key difference recovery function (Diff) that takes, as two input arguments, the first auxiliary data s1 and the second auxiliary data s2 and reconstructs the difference between the keys corresponding to s1 and s2 respectively, the key difference x' between the signing key x and the second distributed key Δ may be obtained (it may be said that Diff and Decode are, in effect, only different in that Diff takes two input arguments, the first auxiliary data s1 and the second auxiliary data s2, while Decode takes one input argument (s1−s2)).

The first distributed signing processing part 126 of the key-based signature generation apparatus 120 receives information from the second distributed signing processing part 136 of the biometric-based signature generation apparatus 130 and performs a two-party distributed signing process (distributed signature generation process) using the second distributed key Δ and the first distributed key x' generated by the biometric-based signature generation apparatus 130 (Steps A6 and B4).

In this case, according to a signature algorithm, the second distributed key Δ generated on the biometric-based signature generation apparatus 130 side may be encrypted using a public key (temporary public key) generated on the biometric-based signature generation apparatus 130 and passed over to the first distributed signing processing part 126 of the key-based signature generation apparatus 120. The first distributed signing processing part 126 of the key-based signature generation apparatus 120 performs an operation to obtain a term containing a sum of the first distributed key x' and the second distributed key Δ, with the second distributed key Δ (which is encrypted on a side of the biometric-based signature generation apparatus 130) kept encrypted, using homomorphic operations of encryption (addition and scalar multiplication operations). The encrypted operation result (a part of operations to derive a signature) may be sent from the first distributed signing processing part 126 to the second distributed signing processing part 136 of the biometric-based signature generation apparatus 130. In this case, the second distributed signing processing part 136 of the biometric-based signature generation apparatus 130 decrypts the encrypted operation result to a plain text using a secret key (temporary secret key) and generates a signature for the message using, as a signing key, a sum (x'+Δ) of the first distributed key x' and the second distributed key Δ. When the sum (x'+Δ) of the first distributed key x' and the second distributed key Δ is equal to the first signing key x, the generated signature can be said to be a correct signature for the message M when verified with the verification key v which corresponds to the first signing key x.

The signature transmission part 137 of the biometric-based signature generation apparatus 130 transmits the signature to a verification destination (verifier) (Step A7).

Regarding the distributed signing process between the biometric-based signature generation apparatus 130 and the key-based signature generation apparatus 120, reference may be made to Reference Literature 1, etc.

A signature scheme on the message M using ECDSA is, for example, as follows.

<Key Generation>

Generating a Secret Key (Signing Key):

$$x \leftarrow^{R} Z_n^* (Z_n^* = [1, n-1], n: \text{a prime number}) \quad (14)$$

where $x \leftarrow^{R} X$ represents selecting uniformly at random an element x from a finite set X.

$$\text{Generating public key:} P = xG \quad (15)$$

where G is a base point of an elliptic curve and a generator of order n.

<Signing>

1. Generating a random number k uniformly at random.

$$k \leftarrow^{R} Zn^* \quad (16)$$

2. Computing $$R = \text{kG}. \quad (17)$$

where R=(x1, y1) is a rational point on the elliptic curve (integer point is a rational point).

3. Computing $$r = xR \bmod n \quad (18)$$

where xR is integer representation of x1.

If r=0, return to step 1.

4. Computing a hash value H(M) of the message M (H(M) is an output bit string obtained by applying the hash function H to M).

5. Computing $$s = k^{\wedge}(-1)(H(M) + r * x) \bmod n \quad (19)$$

where ^ is a power operator.

6. Outputting the signature σ=(r,s).

<Verification>

Receiving a signature σ=(r,s) and message M. Signature verification operation:

1. Computing a hash value H(M).
2. Computing $$u1 = H(M)s^{\wedge}(-1) \bmod n \quad (20a)$$

$$u2 = rs^{\wedge}(-1) \bmod n \quad (20b)$$

3. Computing $$R' = (x1', y1') = u1G + u2Q \quad (21)$$

where Q=xG: public key (verification key).

4. Computing $$r' = xR' \bmod n \quad (22)$$

where xR' is an integer representation of x1'.

5. If r'=r, then outputting 1 (acceptance), else outputting 0 (rejection).

ECDSA does not have key-homomorphism. Therefore, it is difficult to construct a distributed signature using biometric information for ECDSA by key-homomorphism (e.g., Adapt algorithm disclosed in Reference 4 or methods similar thereto). That is, it is necessary to compute an inverse of the random number k^(−1) in order to change a signature with the first distributed key (secret key) x' for the message M without knowing the first signing key (secret key) x and the random number k, but this is difficult. Therefore, it is difficult to compute the signature σ with the signing key (x'+Δ), based on key-homomorphism, by using the second distributed key Δ (shift) and the signature σ' for message M with the first distributed key x'.

According to the present disclosure, in the two-party distributed signing process (2-party ECDSA), the second distributed signing processing part 136 of the biometric-based signature generation apparatus 130 performs the following, for example.

It is assumed that a secret key is x ($\in Z^*_n$=[1, n−1], n: a prime number) and a public key is P=xG, where Gis a reference point (base point) on an elliptic curve and is a generator of order n.

1. Selecting a first random number k1.

$$k1 \leftarrow^{R} Z_n^* (k1 \in [1, n-1]). \quad (23)$$

2. Computing $$R1 = k1 * G \quad (24)$$

where R1 is a (first) rational point on the elliptic curve.

3. Generating a secret key (temporary secret key) sk and a public key (temporary public key) pk.

$$(sk, pk) \leftarrow KeyGen(\lambda) \quad (25)$$

where λ is a security parameter (key length).

4. Encrypting a second distributed key Δ with the public key pk.

$$\text{c\_key} = \text{Encrypt}(pk, \Delta) \quad (26)$$

5. Transmitting the message M, R1, the public key pk, and the key c_key with the second distributed key Δ encrypted thereinto to the key-based signature generation apparatus 120.

The key-based signature generation apparatus 120, on reception of the message M, R1, the public key pk, and the key c_key into which the second distributed key Δ is encrypted, the first distributed signing processing part 126 performs the following:

1. Selecting a second random number k2 uniformly at random.

$$k2 \leftarrow^{R} Z_n^* \ (k2 \in [1, n-1]) \tag{27}$$

2. Computing $$R2 = k2 * G \tag{28}$$

where R2 is a (second) rational point on the elliptic curve.

3. Computing $$R = k2 * R1 = (x1, y1) \tag{29}$$

where R is a (third) rational point on the elliptic curve.

4. Computing $$r = xR \bmod n \tag{30}$$

where xR is an integer representation of x1 of Equation. (29).

5. Computing the following by using homomorphic addition and homomorphic scalar multiplication, with the second distributed key (secret key) Δ kept encrypted, to obtain a ciphertext c3.

$$c3 = \mathrm{Encrypt}(pk, k2 \wedge (-1) * (H(M) + r * (x' + \Delta))) \tag{31}$$

6. Transmitting R2 and c3 to the biometric-based signature generation apparatus 130.

In the biometric-based signature generation apparatus 130, on reception of R2 and c3, the second distributed signing processing part 136 performs the following:

1. Multiplying R2 by the first random number k1.

$$R3 = k1 * R2 = (x3, y3) \tag{32}$$

where R3 is a rational point on the elliptic curve.

2. Computing $$r3 = x\ r3 \bmod n \tag{33}$$

where xr3 is an integer representation of x3.

3. Decrypting the ciphertext c3 using the secret key sk.

$$s' = \mathrm{Decrypt}(sk, c3) \tag{34}$$

4. Multiplying s' by an inverse (inverse element) of the first random number k1.

$$s = k1 \wedge (-1) * s' \tag{35}$$

5. Generating a signature σ=(r,s), from r=r3 in Equation (33) and s in Equation (35).

The second distributed signing processing part 136 of the biometric-based signature generation apparatus 130 and the first distributed signing processing part 126 of the key-based signature generation apparatus 120 may use, as a n encryption algorithm, a n additive homomorphic cryptosystem. For example, Paillier cryptosystem and Elgamal cryptosystem on Elliptic curve fall under a category of the additive homomorphic cryptosystem.

$$\text{Encryption: } c = \mathrm{Encrypt}(pk, m), \tag{36}$$

$$\text{Decryption: } m = \mathrm{Decrypt}(sk, c) \tag{37}$$

where sk and pk are private and public keys, m is a plaintext, and c is a ciphertex, $$\mathrm{c\_}(m1 + m2) = HomAdd(pk, \mathrm{c\_m1}, \mathrm{c\_m2}) \tag{38}$$

The scalar multiplication (homomorphic scalar multiplication) may be implemented by repeating the homomorphic addition HomAdd (k times m), with the message m kept as encrypted, $$\mathrm{c\_km} = HomScl(pk, \mathrm{c\_m}, k) \tag{39}$$

In a cryptographic scheme such as Paillier cryptosystem, there is an efficient computation method for the homomorphic scalar multiplication other than repeating of a homomorphic addition, such a method may be used.

Figure 4:
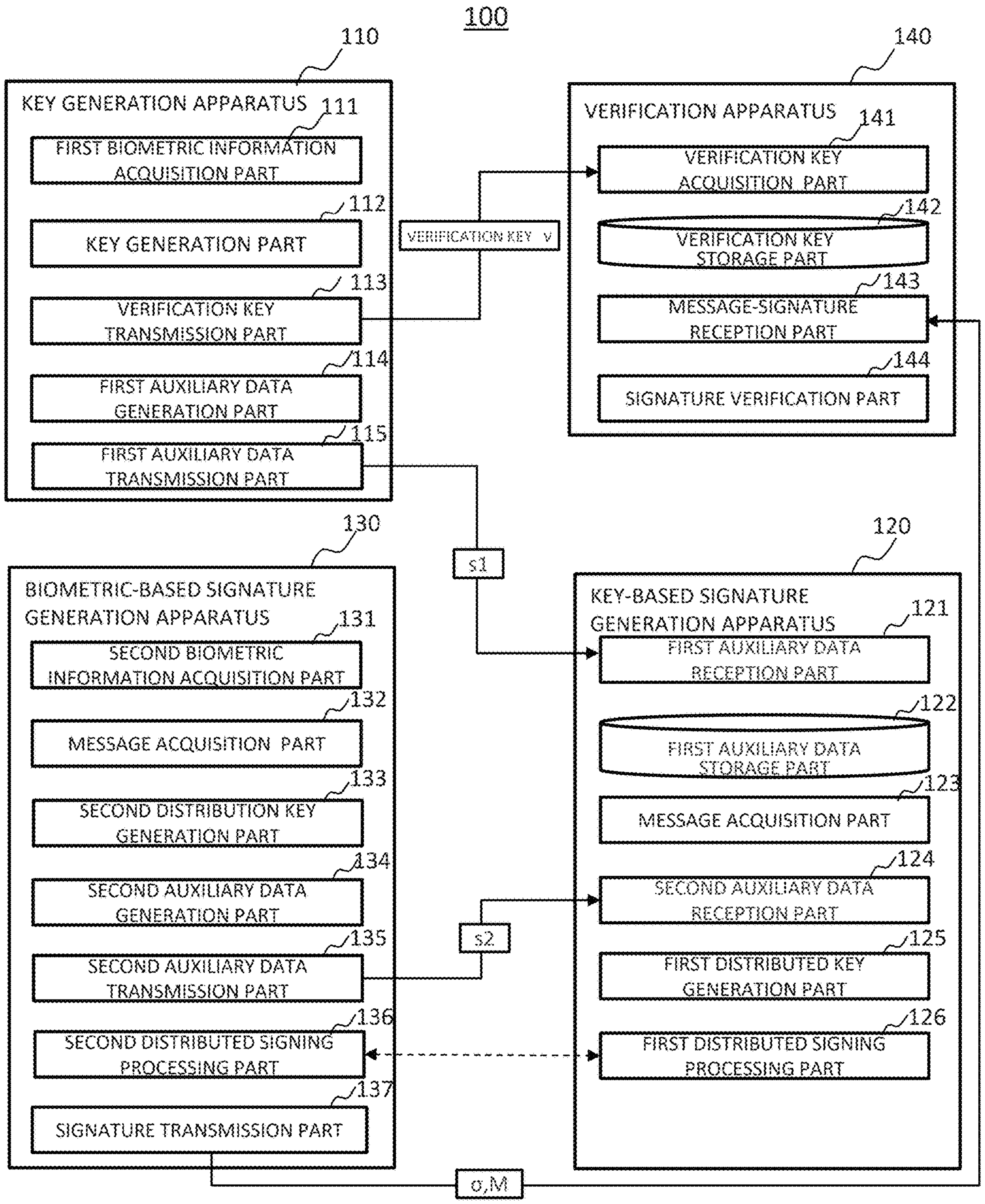
FIG. 4 is a schematic diagram illustrating a configuration example of a system of the present disclosure.

FIG. 4 illustrates a configuration of the system where a key generation apparatus 110 and a verification apparatus 140 are added to a system described with reference to FIG. 2.

In a key registration phase, a key generation part 112 of the key generation apparatus 110, using the key generation algorithm KeyGen, generates a private key x and a public key v based on a security parameter λ.

$$(x, v) \leftarrow KeyGen(\lambda) \tag{40}$$

The key generation algorithm KeyGen may return a pair of the private key x and the public key v simultaneously as a return value. KeyGen may take as input common parameters which have been generated from security parameters in a setup algorithm, and generate a pair of a private key x and a public key v. In key generation, the public key v may be generated based on the private key x (a random number) by using a one-way hash function (such as cryptographic hash function, linear hash function). Alternatively, the public key v may be generated by v=g^φ(x) using a generator g of a multiplication group G with a prime order p and a mapping φ (from a set to which the secret key x belongs to Z (where Z is the set of whole integers). Alternatively, a keyed hash function or the like may be used. A private key x may be referred to as a signing key and a public key v as a verification key.

A verification key transmission part 113 of the key generation apparatus 110 transmits the verification key v to the verification apparatus 140. The key generation apparatus 110 and the verification apparatus 140 may be configured to communicatively connect to each other via a network (e.g., at least one of a wired LAN (Local Area Network), wireless LAN, WAN (Wide Area Network), mobile communication network, virtual network, etc.). The verification key v may be registered in a key server (public key database) associated with a Key ID, for example, without being transmitted to the verification apparatus 140. In this case, the verification apparatus 140 may acquire the verification key v from the key server (public key database) as necessary.

A first biometric information acquisition part 111 of the key generation apparatus 110 acquires the first biometric information w of a user from a sensor not shown or the like.

A first auxiliary data generation part 114 of the key generation apparatus 110 generates the first auxiliary data s1 (auxiliary data 1) using a value c=Encode(x) which is an encoded value of the first signing key x, and the first biometric information w.

$$s1 = \text{Encode}(x) + w \tag{41}$$

A first auxiliary data transmission part 115 of the key generation apparatus 110 transmits the first auxiliary data s1 to the key-based signature generation apparatus 120. The key generation apparatus 110 and the key-based signature generation apparatus 120 may be configured to communicatively connect to each other via a network (e.g., at least one of wired LAN, wireless LAN, WAN, mobile communication network, virtual network, etc.).

The key generation apparatus 110 may transmit the first auxiliary data s1 generated based on the first biometric information w only to the key-based signature generation apparatus 120. In FIG. 4, an arrow line with the first auxiliary data s1, verification key v, and other information to be transmitted is a schematic representation of an example of transmission of information (with handshakes between a source and a destination omitted). As a matter of course, it does not mean that communication between the source and destination is a one-way (unidirectional) communication. The same applies to the subsequent drawings.

A verification key acquisition part 141 of the verification apparatus 140 receives the verification key v from the key generation apparatus 110 and registers it in the verification key storage part 142. A message and signature reception part 143 of the verification apparatus 140 receives the signature σ and message M from the biometric-based signature generation apparatus 130.

A signature verification part 144 of the verification apparatus 140 verifies correctness of a pair of the message M and signature σ using the verification key v $$0/1 \leftarrow \text{Verify}(v, M, \sigma) \tag{42}$$

In the case of ECDSA, the signature verification part 144 of the verification apparatus 140 performs the same verification algorithm for ECDSA as described above.

The verification apparatus 140 may transmit a verification result of the signature σ to the biometric-based signature generation apparatus 130, which is, for example, a transmission source of the signature σ. The biometric-based signature generation apparatus 130 and the verification apparatus 140 may be configured to communicatively connect to each other via a network (e.g., at least one of a wired LAN, wireless LAN, WAN, mobile communication network, virtual network, etc.).

Figure 5:
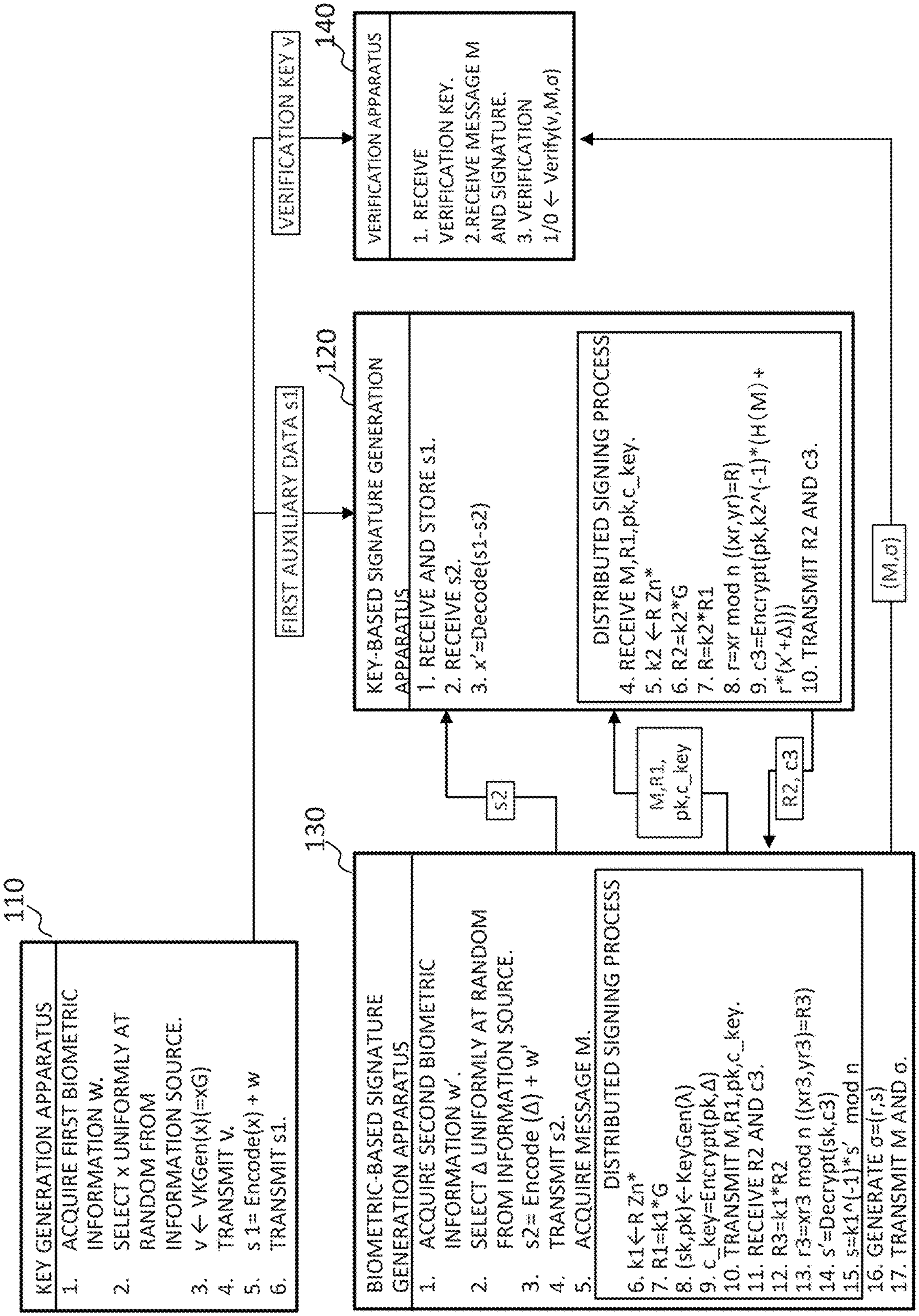
FIG. 5 is a schematic diagram illustrating an example of an operation process of the present disclosure.

FIG. 5 shows an example of an operation flow of the distributed signature generation (Two-Party ECDSA) between the biometric-based signature generation apparatus 130 and the key-based signature generation apparatus 120. In the following, a process number (step number) within each apparatus in FIG. 5 is listed in parenthesis at the end of the description of the process number.

The first biometric information acquisition part 111 of the key generation apparatus 110 acquires the first biometric information w from a sensor not shown or the like (Step 1). The first biometric information w may be features extracted from biometric digital data acquired by a sensor not shown or the like.

The key generation part 112 of the key generation apparatus 110 selects the first signing key x uniformly at random from an information source ($x \leftarrow^{R} Z^{*}_{n}$) (Step 2).

The key generation part 112 of the key generation apparatus 110 generates a verification key v corresponding to the first signature key x, v=xG where G is a base point of an Elliptic curve (Step 3). A pair of the first signature key x and the verification key v may be generated in a single key generation procedure.

The verification key transmission part 113 of the key generation apparatus 110 transmits the verification key v to the verification apparatus 140 (Step 4).

The first auxiliary data generation part 114 generates the first auxiliary data s1 (=c+w) using an encoded key value c (=Encode(x)) of the first signature key x and the first biometric information w (Step 5).

The first auxiliary data transmission part 115 of the key generation apparatus 110 transmits the first auxiliary data s1 to the key-based signature generation apparatus 120 (Step 6).

In the key-based signature generation apparatus 120, the first auxiliary data reception part 121 receives the first auxiliary data s1 and stores it in the first auxiliary data storage part 122 (Step 1).

In a biometric-signing phase, in the biometric-based signature generation apparatus 130, the second biometric information acquisition part 131 obtains the second biometric information w' (Step 1). The second biometric information w' may include feature values of the biometric information w' extracted from biometric digital data acquired by a sensor or the like.

The second distributed key generation part 133 of the biometric-based signature generation apparatus 130 chooses the second distributed key Δ uniformly at random from the information source $$(\Delta \leftarrow^{R} Z^{*}_{n})$$

(Step 2).

The second auxiliary data generation part 134 of the biometric-based signature generation apparatus 130 generates the second auxiliary data s2 (=Encode(Δ)+w') using the second distributed key Δ and the second biometric information w' (Step 3).

The second auxiliary data transmission part 135 of the biometric-based signature generation apparatus 130 transmits the second auxiliary data s2 to the key-based signature generation apparatus 120 (Step 4).

The message acquisition part 132 of the biometric-based signature generation apparatus 130 acquires a message M to be signed (Step 5).

In the key-based signature generation apparatus 120, the second auxiliary data reception part 124 receives the second auxiliary data s2 transmitted from the second auxiliary data transmission part 135 of the biometric-based signature generation apparatus 130 (Step 2).

The first distributed key generation part 125 of the key-based signature generation apparatus 120 decodes a difference (s1−s2) between the first auxiliary data s1 and the second auxiliary data s2 to generate (reconstruct) the first distributed key x' (Step 3).

$$x' = \mathrm{Decode}(s1 - s2) = (x - \Delta)\mathrm{mod}n \tag{43}$$

In the biometric-based signature generation apparatus 130, the second distributed signing processing part 136 performs the following, for example.

Selecting a first random number k1 uniformly at random $$\left(k1 \leftarrow^{R} Z_n^* \,(k1 \in [1,\ n-1])\right)$$

(Step 6).

Computing a rational point (R1=k1*G) on the elliptic curve (Step 7).

Generating a secret key (temporary secret key) sk and a public key (temporary public key) pk using the prescribed key generation algorithm ((sk, pk)←KeyGen(λ)) (where λ is the key length) (Step 8).

Encrypting the second distributed key Δ using the private key sk (Step 9).

$$\mathrm{c\_key} = \mathrm{Encrypt}(\mathrm{pk}, \Delta) \tag{44}$$

The message M, R1, the public key pk, and the key: c_key, to which the second distributed key Δ is encrypted, are transmitted to the key-based signature generation apparatus 120 (Step 10).

In the key-based signature generation apparatus 120, the first distributed signing processing part 126 receives the message M, R1, the public key pk, and the key: c_key, to which the second distributed key Δ is encrypted (Step 4).

The message acquisition part 123 of the key-based signature generation apparatus 120 acquires the message M.

The first distributed signing processing part 126 of the key-based signature generation apparatus 120 selects a second random number k2 uniformly at random ($k2 \leftarrow^{R} Z^*_n$ ($k2 \in [1, n-1]$)) (Step 5).

The first distributed signing processing part 126 of the key-based signature generation apparatus 120 computes a rational point (R2=k2*G) on the elliptic curve using the second random number k2 (Step 6).

The first distributed signing processing part 126 of the key-based signature generation apparatus 120 uses the second random number k2 and R1 received from the biometric-based signature generation apparatus 130 to compute a rational point R on the elliptic curve (Step 7).

$$R = k2 * R1 = (x1,\ y1) \tag{45}$$

The first distributed signing processing part 126 of the key-based signature generation apparatus 120 computes r (Step 8).

$$r = xr\mathrm{mod}n \tag{46}$$

where xr is an integer representation of x1 in Equation (45) (in FIG. 5, R (=k2*R1) is denoted as (xr, yr)=R).

The first distributed signing processing part 126 of the key-based signature generation apparatus 120 computes a hash value H(M) of the message M and computes a value (cipher value) c3, which is a result of an encryption of a value obtained by multiplying by an inverse element of the second random number k2, a value obtained by adding H(M) to a value obtained by multiplying, by r, a sum (x'+Δ) of the first distributed key x' and the second distributed key Δ (Step 9). During this computation, the second distributed key Δ remains encrypted.

$$c3 = \mathrm{Encrypt}(\mathrm{pk},\ k2\hat{\ }(-1) * (H(M) + r * (x' + \Delta))) \tag{47}$$

In derivation of c3 of Equation (47), the first distributed signing processing part 126 of the key-based signature generation apparatus 120 finds the inverse element k2^(−1) of the second random number k2 on $$Z_n^*\left(k2\hat{\ }(-1) \in Z_n^*\right)$$

and multiplies the hash value H(M) of the message M by k2^(−1) (k2^(−1))H(M)mod n.

The first distributed signing processing part 126 of the key-based signature generation apparatus 120 computes a value (k2^(−1)) r*x' mod n, which is obtained by multiplying r*x' by (k2^(−1), where x' is the first distributed key and r is obtained by Equation (46), performs modulo n addition of (k2^(−1)) r*x' and k2^(−1) (k2^(−1))H(M).

$$(k2\hat{\ }(-1))\{H(M) + r * x'\}\mathrm{mod}n \tag{48}$$

and encrypts the added value using the public key pk to obtain c1.

$$c1 = \mathrm{Encrypt}(\mathrm{pk},\ k2\hat{\ }(-1) * \{(H(M)) + r * x'\}\mathrm{mod}n) \tag{49}$$

The first distributed signing processing part 126 of the key-based signature generation apparatus 120 performs a scalar multiplication of (k2^(−1))*r mod n on c_key=Encrypt(pk, Δ) received from the biometric-based signature generation apparatus 130 to obtain c2.

$$c2 = \text{Encrypt}(\text{pk}, (k2^\wedge(-1)) * r * \Delta)\text{mod}n) \quad (50)$$

The first distributed signing processing part 126 of the key-based signature generation apparatus 120 obtains c3 from c1 and c2, based on additive homomorphism (additive homomorphic encryption).

$$\begin{aligned} c3 = c1 + c2 &= \text{Encrypt}(\text{pk}, k2^\wedge(-1) * (H(M) + r * x')) + \\ &\quad \text{Encrypt}(\text{pk}, k2^\wedge(-1) * r * \Delta) \\ &= \text{Encrypt}(\text{pk}, k2^\wedge(-1) * (H(M) + r * (x' + \Delta)\text{mod}n) \end{aligned} \quad (51)$$

The first distributed signing processing part 126 of the key-based signature generation apparatus 120 transmits R2 (R2=k2*G) and the encrypted value c3 to the biometric-based signature generation apparatus 130 (Step 10).

The second distributed signing processing part 136 of the biometric-based signature generation apparatus 130 receives R2 and c3 from the first distributed signing processing part 126 of the key-based signature generation apparatus 120 (Step 11).

Upon reception of R2 and c3, the second distributed signing processing part 136 of the biometric-based signature generation apparatus 130 performs the following.

The second distributed signing processing part 136 of the biometric-based signature generation apparatus 130 computes, using the first random numbers k1 and R2, a rational point on the elliptic curve R3=k1*R2=(x3, y3) (Step 12).

The second distributed signing processing part 136 of the biometric-based signature generation apparatus 130 obtains $$r3 = xr3\text{mod}n \quad (52)$$

where xr3 is an integer representation of x3 of x3 in the rational point R3=(x3, y3) on the elliptic curve (Step 13).

The second distributed signing processing part 136 of the biometric-based signature generation apparatus 130 decrypts the encrypted value c3 using the secret key sk (Step 14).

$$s' = \text{Decrypt}(sk, c3) \quad (53)$$

The second distributed signing processing part 136 of the biometric-based signature generation apparatus 130 computes s, by multiplying s' and an inverse (inverse element) =k1^(−1) of the first random number k1 to obtain s (Step 15).

$$s = k1^\wedge(-1) * s'\text{mod}n = (k1 * k2)^\wedge(-1) * (H(M) + r * (x' + \Delta)\text{mod}n \quad (54)$$

The second distributed signing processing part 136 of the biometric-based signature generation apparatus 130 generates a signature σ=(r,s) (Step 16), where r is r3 obtained in Equation (52) and sis s obtained in Equation (54).

The signature transmission part 137 of the biometric-based signature generation apparatus 130 transmits the message M and the signature σ=(r,s) to the verification apparatus 140 (Step 17). The message M and the signature σ=(r,s) may be transmitted separately or together.

The message and signature reception part 143 of the verification apparatus 140 receives the message M and the signature σ (Step 2). The signature verification part 144 verifies the signature σ for the message M using the verification key v (=xG) which corresponds to the first signature key x (1/0+Verify(vk, M, σ)) (Step 3).

On reception of the signature σ=(r,s) and the message M, the signature verification part 144 computes the hash value H(M) of the message M.

Next, the signature verification part 144 computes $$u1 = H(M)s^\wedge(-1)\text{mod}n \quad (55a)$$

$$u2 = rs^\wedge(-1)\text{mod}n \quad (55b)$$

and $$R' = (x1', y1') = u1G + u2v \quad (56)$$

where v=xG is a verification key corresponding to the first signature key x.

Substituting u1 and u2 in Equations (55a) and (55b) into the right side of Equation (56), the signature verification part 144 computes $$\begin{aligned} R' &= (H(M)s^\wedge(-1)\text{mod}n)G + (rs^\wedge(-1)\text{mod}n)xG \\ &= s^\wedge(-1)(H(M) + r * x\text{mod}n)G \\ &= (k2 * k2) * (H(M) + r * (x' + \Delta)\text{mod}n)^\wedge(-1)(H(M) + r * x\text{mod}n)G \end{aligned} \quad (57)$$

In Equation (57), $$\text{if } x = x' + \Delta\text{mod}n, \quad (58)$$

then the denominator (H(M)+r*(x'+Δ)mod n) of the right side of equation (57) coincides with the numerator (H(M)+r*x mod n), and the following holds.

$$R' = (k1 * k2)G = R3( = (x3, y3)). \quad (59)$$

Assuming that xR' and xr3 are integer representation of x1' in Equation (56) and x3 in Equation (59), respectively, Equation (59) is equivalent to the following.

$$r' = xR'\text{mod}n = xr3\text{mod}n( = r3), \quad (60)$$

That is, r' matches r (=r3) of the signature σ=(r,s) and Verify(vk, M, σ) returns an acceptance (1).

On the other hand, in Equation (57), $$\text{if } x \neq x' + \Delta \bmod n \tag{61}$$

then the denominator (H(M)+r*(x'+Δ)mod n) of the right side of Equation (57) does not match the numerator (H(M)+ r*x mod n), $$R' \neq (k1 * k2)G \tag{62}$$

Therefore, R'≠R3, mr'=xR' mod n≠xr3 mod n (=r3)

Since r' does not match r(=r3) in the signature (r,s), Verify (vk, M, σ) returns a rejection (0).

Message M may be given externally to each of the key-based signature generation apparatus 120 and the biometric-based signature generation apparatus 130.

For the purpose of increasing security, a zero-knowledge proof (Non-Interactive zero-knowledge (NIZK)) about the first random number k1 may be provided from the biometric-based signature generation apparatus 130 to the key-based signature generation apparatus 120. In this case, the biometric-based signature generation apparatus 130 and the key-based signature generation apparatus 120 share a proof generation key and a proof verification key. For example, in FIG. 5, the second distributed signing processing part 136 of the biometric-based signature generation apparatus 130, which is a prover computes the rational point R1 on the elliptic curve using the first random number k1 (step (7) of the biometric-based signature generation apparatus 130 in FIG. 5) and then, from an instance (R1) of a proposition to be proved (having knowledge about the first random number k1) and an evidence (witness) that this proposition is correct, generates a proof (NIZK proof) (π1). The instance (R1) and the proof (π1) may be sent to the key-based signature generation apparatus 120, which is a verifier. After receiving the instance (R1) and the proof (π1), the key-based signature generation apparatus 120, which is the verifier, may verify the proof (π1) using the proof verification key.

A non-interactive zero-knowledge proof of knowledge of the second random number k2 may be provided from the key-based signature generation apparatus 120 to the biometric-based signature generation apparatus 130. For example, in FIG. 5, the first distributed signing processing part 126 of the key-based signature generation apparatus 120, which is a prover, may, for example, computes the rational point R2 on the elliptic curve using the second random number k2 (step (6) of the key-based signature generation apparatus 120 in FIG. 5) and then send an instance (R2) of a proposition to be proved (instance about the second random number k2) and then from the instance (R2) of the proposition to be proved and an evidence that this proposition is correct, a proof (π2) is generated. The instance (R2) and the proof π2 may be sent to the biometric-based signature generation apparatus 130, which is a verifier. After receiving the instance (R2) and proof (π2), the verifier, the biometric-based signature generation apparatus 130, the biometric-based signature generation apparatus 130 may verify the proof (π2) using the proof verification key. The biometric-based signature generation apparatus 130 may decommit to the instance (R2) and proof (π2), and the key-based signature generation apparatus 120 may verify the proof (π2) after the commitment is released (reference may be made to Reference Literature 1).

The biometric-based signature generation apparatus 130 may execute the key generation algorithm (sk, pk)←KeyGen(λ) of additive homomorphic cryptography in advance, store the key pair (sk, pk) of the secret key and public key, and transmit the public key pk to the key-based signature generation apparatus 120. The kay pair may be used for signature generation.

The biometric-based signature generation apparatus 130 may transmit s2 and M, R1, pk, and c_key to the key-based signature generation apparatus 120 at the same time or may transmit them separately.

The following describes a Schnorr signature scheme as another example of distributed signature generation between the biometric-based signature generation apparatus 130 and the key-based signature generation apparatus 120. The Schnorr signature is outlined as below.

<Key Generation> p and q are prime numbers q|(p−1) (q is a divisor of p−1)

g is an element of an order q of a multiplication group $Z_p$*, i.e. g^q≡1 (mod p)

A secret key x is selected uniformly at random.

$$x \leftarrow^R Z_q \left(\text{where } Z_q = Z/qZ \text{ is a set of integers } \{0, 1, \ldots, q-1\}\right) \tag{63}$$

The symbol "$\leftarrow^R$" represents that the secret key x is selected uniformly at random from an information source (in this case, $Z_q$).

The public key v is computed.

$$v = g^\wedge x \bmod p \tag{64}$$

The public key may be p, q, g, or v. However, p, q, and g may be shared by each apparatus as common parameters, and the public key may be v.

<Signature> k is selected uniformly at random.

$$k \leftarrow^R Z_q \tag{65}$$

$$r = g^\wedge k \bmod p \tag{66}$$

Hash function H takes as input r and a message M.

$$e = H(r, M) \tag{67}$$

s is computed using k, e and x.

$$s = k - e * x \bmod q \tag{68}$$

Signature σ=(e, s)

<Verification>

The verification process Verify(vk, M, σ) (where v=g^x mod p: public key) that verifies using the verification key, the signature σ=(e, s) and message M, computes $$r' = (g^\wedge s)(v^\wedge e) \bmod p \tag{69}$$

and checks if a hash value of the Hash function H which takes as input r' and M equals e of the signature σ.

$$e = H(r', M) \tag{70}$$

Verify(vk, M, σ) returns 1 (acceptance) if Equation (70) holds, and 0 (rejection) if Equation (70) does not hold. Verify(vk, M, σ) may return 1 (acceptance) if $$g^\wedge k = (g^\wedge s) * (v^\wedge e) \bmod p \tag{71}$$

holds, and 0 (rejection) if not.

Figure 6:
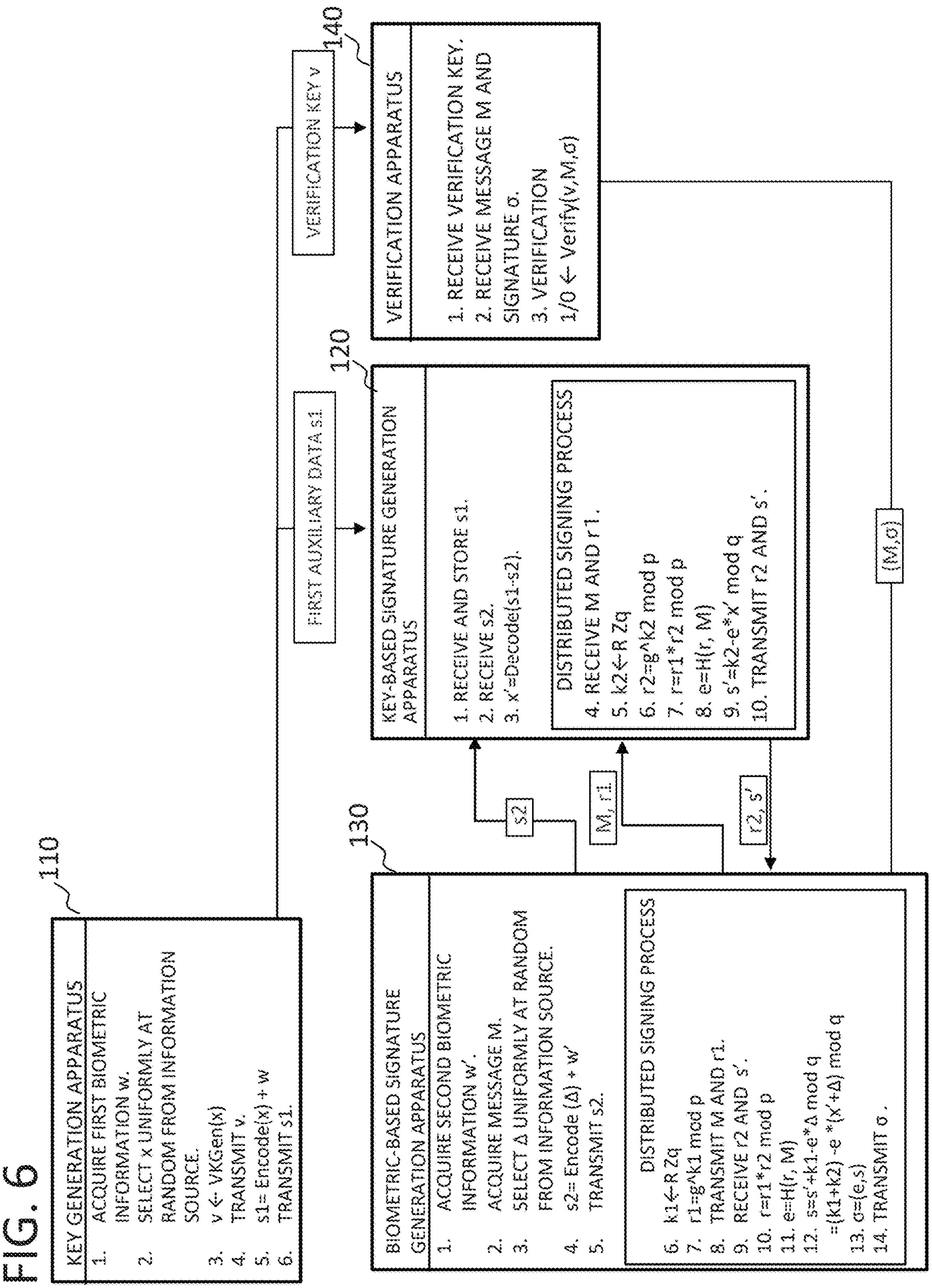
FIG. 6 is a schematic diagram illustrating another example of an operation process of the present disclosure.

FIG. 6 illustrates an example of an operational flow of a two-party distributed signing process (two-Party Schnorr signature) between the biometric-based signature generation apparatus 130 and the key-based signature generation apparatus 120. For two-party distributed Schnorr signatures, reference may be made to for example, Reference 3. In the following, the process numbers (step numbers) within each apparatus in FIG. 6 are shown in parentheses at the end of the description of the process number concerned.

The first biometric information acquisition part 111 of the key generation apparatus 110 acquires the first biometric information w (Step 1).

The key generation part 112 of the key generation apparatus 110 selects the first signature key x uniformly at random ($x \xleftarrow{R} F_n^*$) (Step 2).

The key generation part 112 of the key generation apparatus 110 generates a verification key v corresponding to the first signature key x (v=g^x) (Step 3). The pair of the first signature key x and the verification key v may be generated in a single key generation procedure.

The verification key transmission part 113 of the key generation apparatus 110 transmits the verification key v to the verification apparatus 140 (Step 4).

The first auxiliary data generation part 114 of the key generation apparatus 110 generates the first auxiliary data s1 (=Encode(x)+w) using an encoded key c (=Encode(x)) of the first signature key x and the first biometric information w (Step 5).

The first auxiliary data transmission part 115 of the key generation apparatus 110 transmits the first auxiliary data s1 to the key-based signature generation apparatus 120 (Step 6).

In the key-based signature generation apparatus 120, the first auxiliary data reception part 121 receives the first auxiliary data s1 and stores it in the first auxiliary data storage part 122 (Step 1).

In the biometric-based signature generation apparatus 130, the second biometric information acquisition part 131 acquires the second biometric information w' (Step 1). The message acquisition part 132 acquires the message M (Step 2).

The second distributed signing processing part 136 of the biometric-based signature generation apparatus 130 selects a second distributed key Δ uniformly at random ($\Delta \xleftarrow{R} Z_q$) (Step 3).

The second auxiliary data generation part 134 of the biometric-based signature generation apparatus 130 generates the second auxiliary data s2 (=Encode(Δ)+w') using the second distributed key Δ and the second biometric information w' (Step 4).

The second auxiliary data transmission part 135 of the biometric-based signature generation apparatus 130 transmits the message M and the second auxiliary data s2 to the key-based signature generation apparatus 120 (Step 5).

In the key-based signature generation apparatus 120, the second auxiliary data reception part 124 receives the second auxiliary data s2 transmitted from the second auxiliary data transmission part 135 of the biometric-based signature generation apparatus 130 (Step 2).

The first distributed key generation part 125 of the key-based signature generation apparatus 120 decodes a difference between the first auxiliary data s1 and the second auxiliary data s2 (s1−s2) to generate the first distributed key x' (Step 3).

$$x' = \mathrm{Decode}(s1 - s2) = (x - \Delta) \bmod q (x' \in Z_q) \tag{72}$$

In the biometric-based signature generation apparatus 130, the second distributed signing processing part 136 may perform the following, for example.

The second distributed signing processing part 136 of the biometric-based signature generation apparatus 130 selects a first random number k1 uniformly at random ($k1 \xleftarrow{R} Z_q$, where k1∈[0, q−1]) (Step 6).

The second distributed signing processing part 136 of the biometric-based signature generation apparatus 130 obtains a value r1 by multiplying the generator of the group g by the first random number k1 (Step 7).

$$r1 = g^\wedge k1 \bmod p \tag{73}$$

The second distributed signing processing part 136 of the biometric-based signature generation apparatus 130 transmits the message M and r1 to the key-based signature generation apparatus 120 (Step 8).

The first distributed signing processing part 126 of the key-based signature generation apparatus 120 receives the message M and r1 transmitted from the biometric-based signature generation apparatus 130 (Step 4).

The first distributed signing processing part 126 of the key-based signature generation apparatus 120 chooses a second random number k2 uniformly at random ($k2 \xleftarrow{R}$ Zq(k2∈[0, q−1])) (Step 5).

The first distributed signing processing part 126 of the key-based signature generation apparatus 120 obtains a value r2 by multiplying the generator g by a second random number k2 (Step 6).

$$r2 = g^\wedge k2 \bmod p. \tag{74}$$

The first distributed signing processing part 126 of the key-based signature generation apparatus 120 multiplies r2 by r1 transmitted from the biometric-based signature generation apparatus 130 to obtain the value r (Step 7).

$$r = r1 * r2 \bmod p \tag{75}$$

The first distributed signing processing part 126 of the key-based signature generation apparatus 120 supplies as input r and the message M to the hash function H to compute the following (Step 8):

$$e = H(r, M)\left(\in Z_q^*\text{: a set of integers prime to } Z_q \text{ and } q\right) \quad (76)$$

The first distributed signing processing part 126 of the key-based signature generation apparatus 120 uses a multiplied value of e and the first distributed key x' and the second random number k2 to compute the following (Step 8).

$$s' = k2 - e * x' \bmod q \quad (77)$$

(e, s') may be a part of the distributed signature.

The first distributed signing processing part 126 of the key-based signature generation apparatus 120 transmits r2 derived by Equation (74) and s' (the second element of the signature) to the biometric-based signature generation apparatus 130 (Step 10).

The second distributed signing processing part 136 of the biometric-based signature generation apparatus 130 receives r2 and s' transmitted from the key-based signature generation apparatus 120 (Step 9).

The second distributed signing processing part 136 of the biometric-based signature generation apparatus 130 obtains a value r by multiplying r2 (=g^k2 mod p) received from the key-based signature generation apparatus 120 by r1 (=g^k1 mod p) computed by the second distributed signing processing part 136 (Step 10).

$$r = r1 * r2 \bmod p = g^\wedge(k1 + k2 \bmod q) \bmod p \quad (78)$$

The second distributed signing processing part 136 of the biometric-based signature generation apparatus 130 supplies r and the message M to the hash function H to obtain the following (Step 11).

$$e = H(r, M) \quad (79)$$

The second distributed signing processing part 136 of the biometric-based signature generation apparatus 130 computes the following (Step 12).

$$\begin{aligned} s &= (s' + k1 - e * \Delta) \bmod q \quad (80) \\ &= \{(k1 + k2) - e * (x' + \Delta)\} \bmod q \end{aligned}$$

The second distributed signing processing part 136 of the biometric-based signature generation apparatus 130 generates (completes) the signature σ=(e, s) for the message M by the signature key (x'+Δ) (Step 13).

The signature transmission part 137 of the biometric-based signature generation apparatus 130 transmits the message M and the signature σ=(e, s) to the verification apparatus 140 (Step 14).

In the verification apparatus 140, on reception of the signature σ=(e, s) and message M by the message and signature reception part 143, the signature verification part 144 verifies correctness of a pair of the signature σ=(e, s) and the message M using the verification key v (=g^x mod p) (Verify(vk, M, σ)). That is, the signature verification part 144 obtains a value r', which is obtained by multiplying the generator g raised to s (power) and the public key v raised to e (power).

$$r' = (g^\wedge s) * (v^\wedge e) \bmod p \quad (81)$$

Then, the hash value for r' and message M $$H(r', M) \quad (82)$$

is obtained.

Verify(vk, M, σ) returns 1 (acceptance), if the following holds, $$e = H(r', M) \quad (83)$$

else returns 1 (rejection).

That is, for the right side of Equation (81), $$g^\wedge s = g^\wedge\{(k1 + k2 - e * (x' + \Delta)) \bmod q\} \bmod p \quad (84)$$

$$v^\wedge e = g^\wedge\{(x * e) \bmod q\} \bmod p \quad (85)$$

From this, r' in Equation (81) is given as follows.

$$r' = g^\wedge\{(k1 + k2 - e * (x' + \Delta) + e * x) \bmod q\} \bmod p \quad (86)$$

$$x = x' + \Delta \bmod q \quad (87)$$

The right hand side of equation (86) is, $$r' = g^\wedge\{(k1 + k2) \bmod q\} \bmod p \quad (88)$$

r' coincides to r in Equation (78). Thus, $$H(r', M) = H(r, M) = e \quad (89)$$

holds and Verify(vk, M, σ) returns 1 (acceptance).

$$\text{On the other hand,} \quad (90)$$

$$x \neq x' + \Delta \bmod q$$

then r'≠r

Therefore, $$H(r', M) \neq e \quad (91)$$

and Verify(vk, M, σ) returns 0 (rejection).

Verify(vk, M, σ) in the signature verification part 144 may return 1 (acceptance) if (g^s)*(v^e) matches the right side of Equation (78): r1*r2 mod p=g^{(k1+k2)mod q} mod p, and 0 (rejection) if it does not match.

For the purpose of increasing security, a zero-knowledge proof (Non-Interactive zero-knowledge (NIZK)) about the first random number k1 may be provided from the biometric-based signature generation apparatus 130 to the key-based signature generation apparatus 120. In this case, the biometric-based signature generation apparatus 130 and the key-based signature generation apparatus 120 share a proof generation key and a proof verification key. For example, in FIG. 6, the second distributed signing processing part 136 of the biometric-based signature generation apparatus 130 which is a prover, computes r1 using the first random number k1 (step (6) of the biometric-based signature generation apparatus 130 in FIG. 6) and then, from an instance (r1) of a proposition to be proved (having knowledge about the first random number k1) and an evidence (witness) that this proposition is correct, generates a proof (NIZK proof) (π1). The instance (r1) and the proof (π1) may be sent to the key-based signature generation apparatus 120, which is a verifier. After receiving the instance (r1) and the proof (π1), the key-based signature generation apparatus 120, which is the verifier, may verify the proof (π1) using the proof verification key.

A non-interactive zero-knowledge proof of knowledge of the second random number k2 may be provided from the key-based signature generation apparatus 120 to the biometric-based signature generation apparatus 130. For example, in FIG. 6, the first distributed signing processing part 126 of the key-based signature generation apparatus 120, which is a prover, may compute r2 using the second random number k2 (step (6) of the key-based signature generation apparatus 120 in FIG. 6) and then send an instance (r2) of a proposition to be proved (instance about the second random number k2) and then may generate a proof (π2) from the instance (r2) of the proposition to be proved and an evidence that this proposition is correct. The instance (r2) and the proof (π2) may be sent to the biometric-based signature generation apparatus 130, which is a verifier. After receiving the instance (R2) and proof (π2), the biometric-based signature generation apparatus 130 may verify the proof (π2) using the proof verification key. The biometric-based signature generation apparatus 130 may decommit the instance (R2) and proof (π2), and the key-based signature generation apparatus 120 may verify the proof (π2) after the commitment is released (reference may be made to Reference Literature 1).

Figure 7:
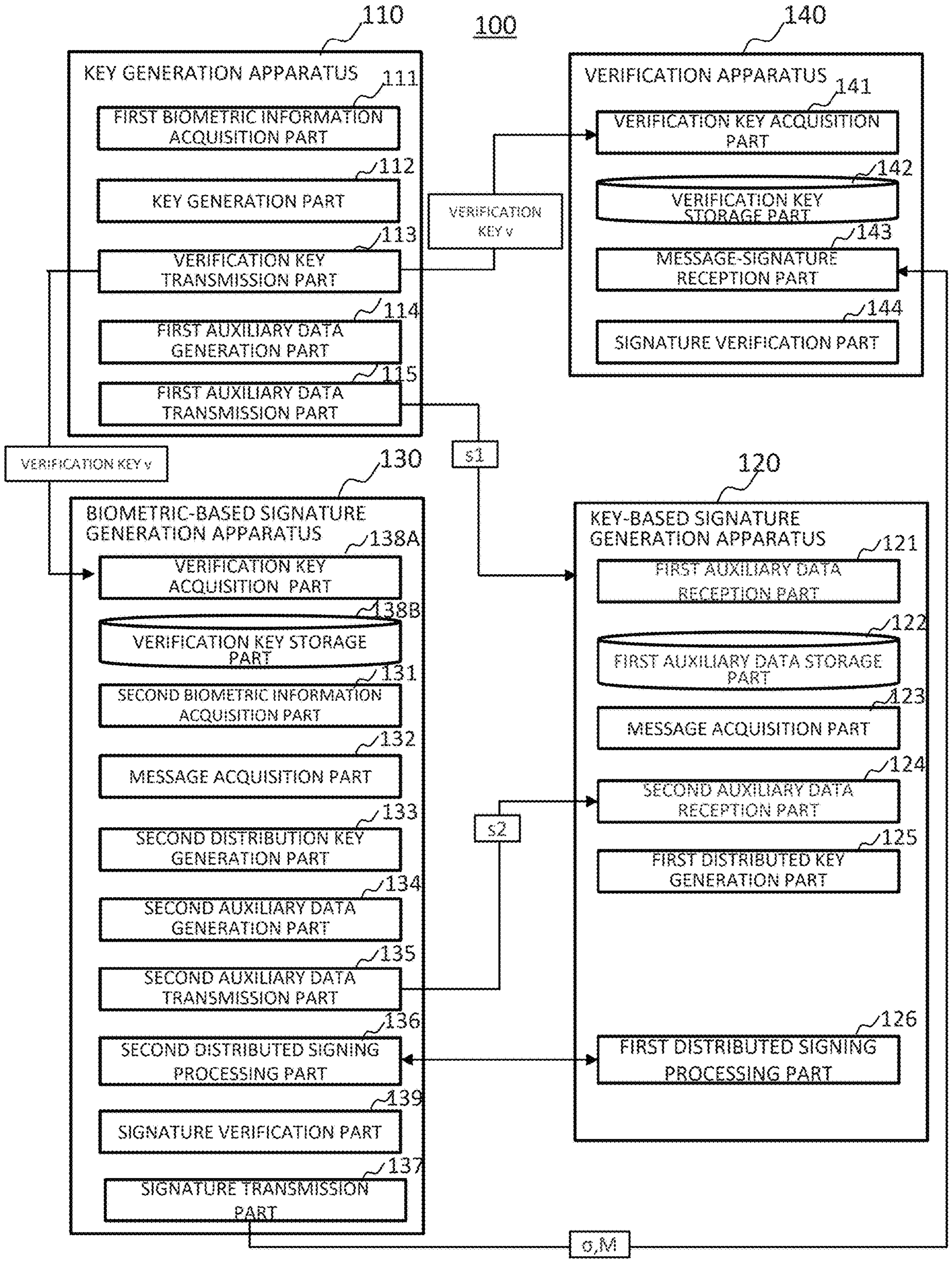
FIG. 7 is a schematic diagram illustrating a configuration example of a system of the present disclosure.

FIG. 7 illustrates a variation of the example embodiment. In FIG. 7, the description of the same elements as in FIG. 4 is omitted. The biometric-based signature generation apparatus 130 verifies correctness (acceptance/rejection) of the signature σ for the message M generated with the two-party distributed signing process by the second distributed signing processing part 136 and the first distributed signing processing part 126 of the key-based signature generation apparatus 120. The signature σ, when accepted, is transmitted to the verification apparatus 140, but not transmitted when rejection. This increases security by preventing leakage of secret key information from the signature if the signature σ is an incomplete signature, and it also may suppress an increase in network traffic between the verification apparatus 140 and the biometric-based signature generation apparatus 130.

The difference from FIG. 4 is that the biometric-based signature generation apparatus 130 includes a verification key acquisition part 138A, a verification key storage part 138B, and a signature verification part 139. The verification key transmission part 113 of the key generation apparatus 110 transmits the verification key v to the verification apparatus 140 and the biometric-based signature generation apparatus 130.

The signature verification part 139 of the biometric-based signature generation apparatus 130 verifies correctness of a pair of the signature σ and the message M using the verification key v, where the signature σ is generated by the second distributed signing processing part 136 in cooperation with the first distributed signing processing part 126 of the key-based signature generation apparatus 120 using the distributed signature generation algorithm. The signature verification part 139 performs the same verification process as the signature verification part 144 of the verification apparatus 140. When a pair of the signature σ and the message M is verified to be correct by the signature verification part 139, the signature transmission part 137 transmits the signature σ and the message M to the verification apparatus 140. If the pair of the signature σ and the message M is not correct, the signature σ is not transmitted. An error message may be output to a display apparatus not shown.

Figure 8:
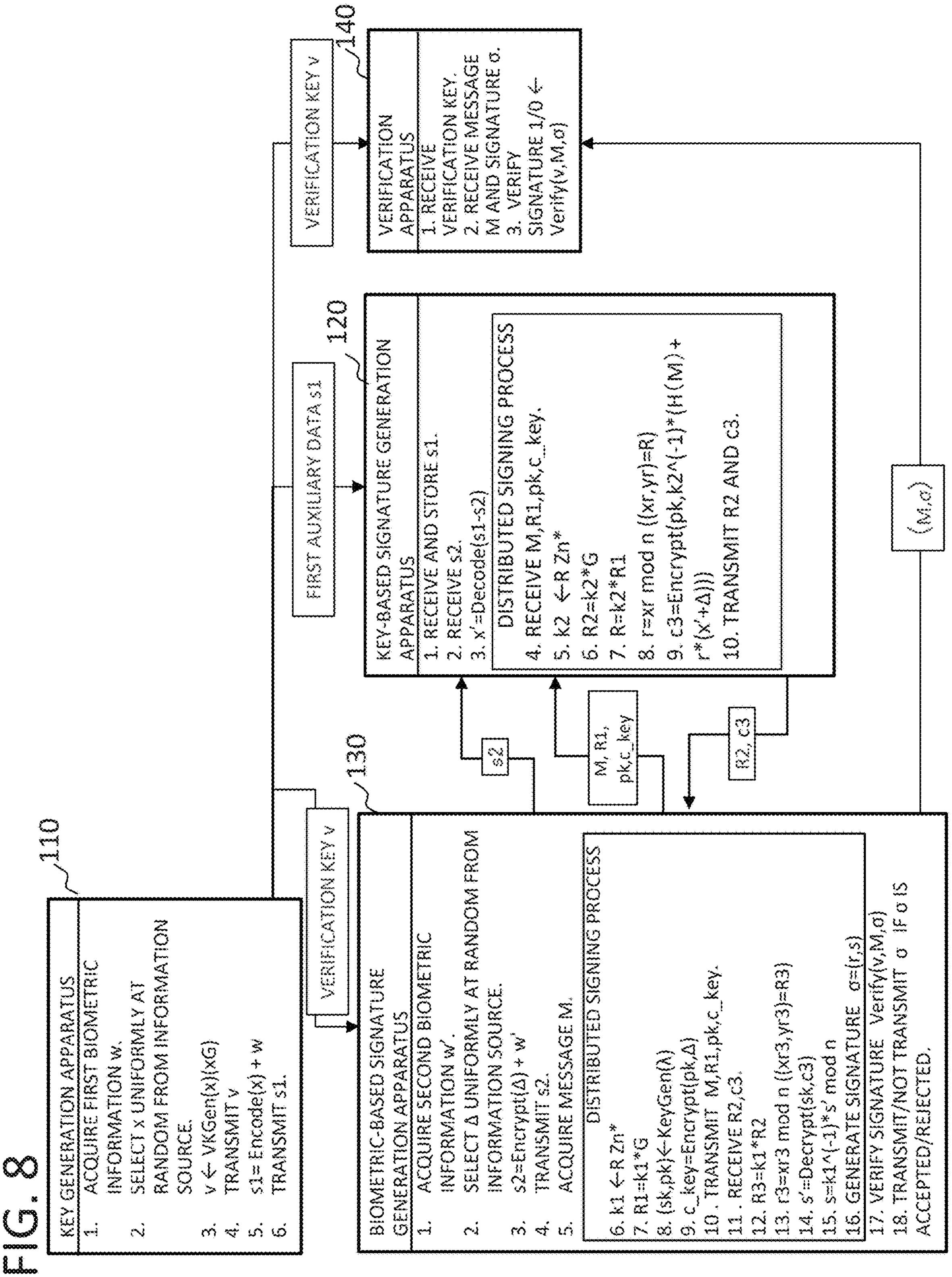
FIG. 8 is a schematic diagram illustrating an example of an operation process of the present disclosure.

FIG. 8 illustrates an example of an operational flow of a two-party distributed signing process of the variation example. FIG. 8 corresponds to FIG. 5. The description of operations same as those in FIG. 5 are omitted. Referring to FIG. 8, in the biometric-based signature generation apparatus 130, a pair of the signature σ and message M is verified using the verification key v (Verify(v, M, σ)) (17). If the pair of the signature σ and the message M is correct (accepted), as a result of the verification, the signature transmission part 137 transmits the signature σ and message M to the verification apparatus 140 (Step 18). If the pair of the signature σ and the message M is not correct (rejected) as a result of the verification, the signature σ and message M are not transmitted to the verification apparatus 140.

Figure 9:
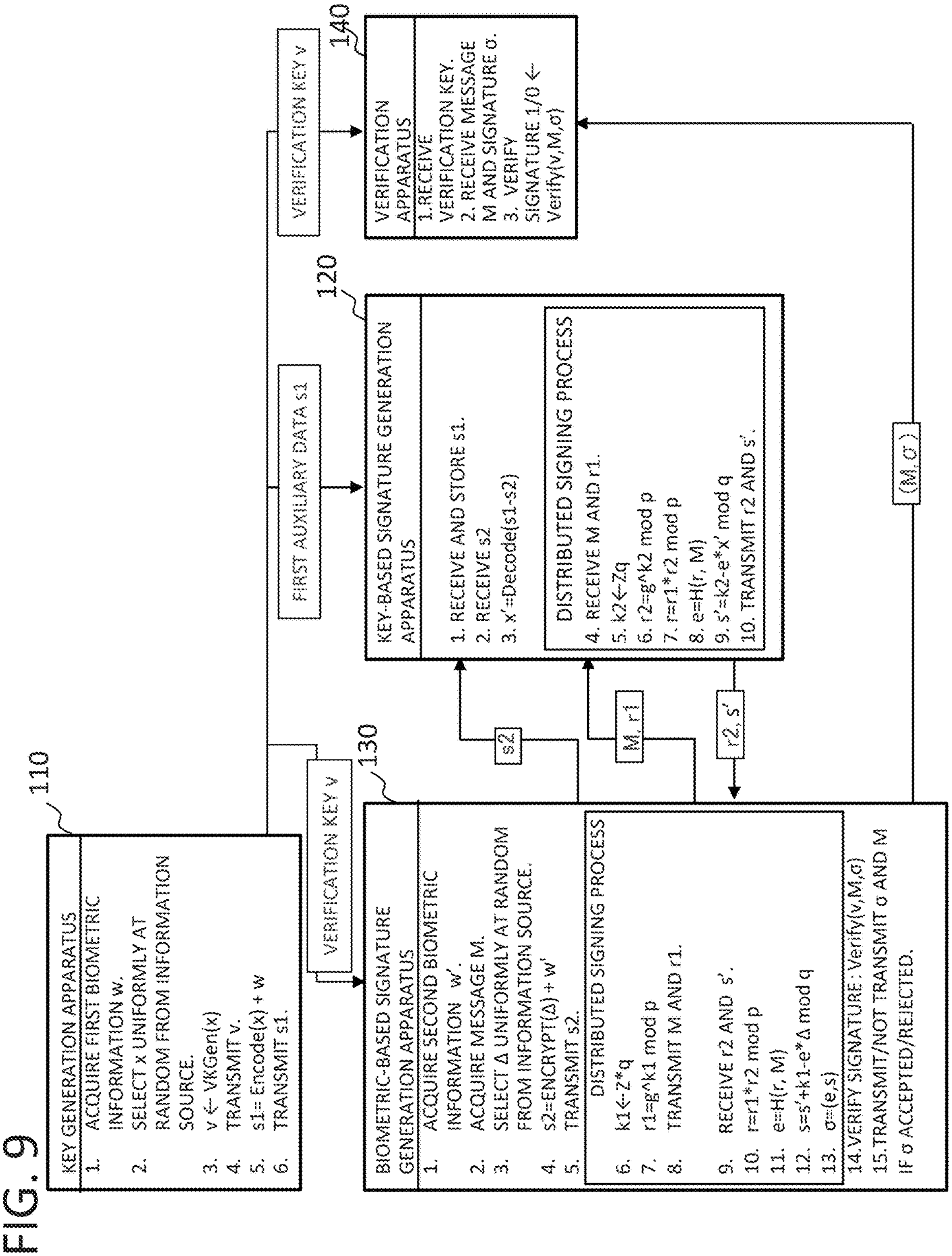
FIG. 9 is a schematic diagram illustrating another example of an operation process of the present disclosure.

FIG. 9 illustrates an example of an operational flow of a two-party distributed signing process of the variation example. FIG. 9 corresponds to FIG. 6. The description of operations same as those in FIG. 6 are omitted. Referring to FIG. 9, in the biometric-based signature generation apparatus 130, a pair of the signature σ and the message M is verified using the verification key v (Verify(v, M, σ)) (Step 14). If the pair of the signature σ and the message M is correct (accepted), as a result of the verification, the signature transmission part 137 transmits the signature σ and message M to the verification apparatus 140 (Step 15). If the pair of the signature σ and the message M is not correct (rejected) as a result of the verification, the signature σ and message M are not transmitted to the verification apparatus 140.

Figure 10A:
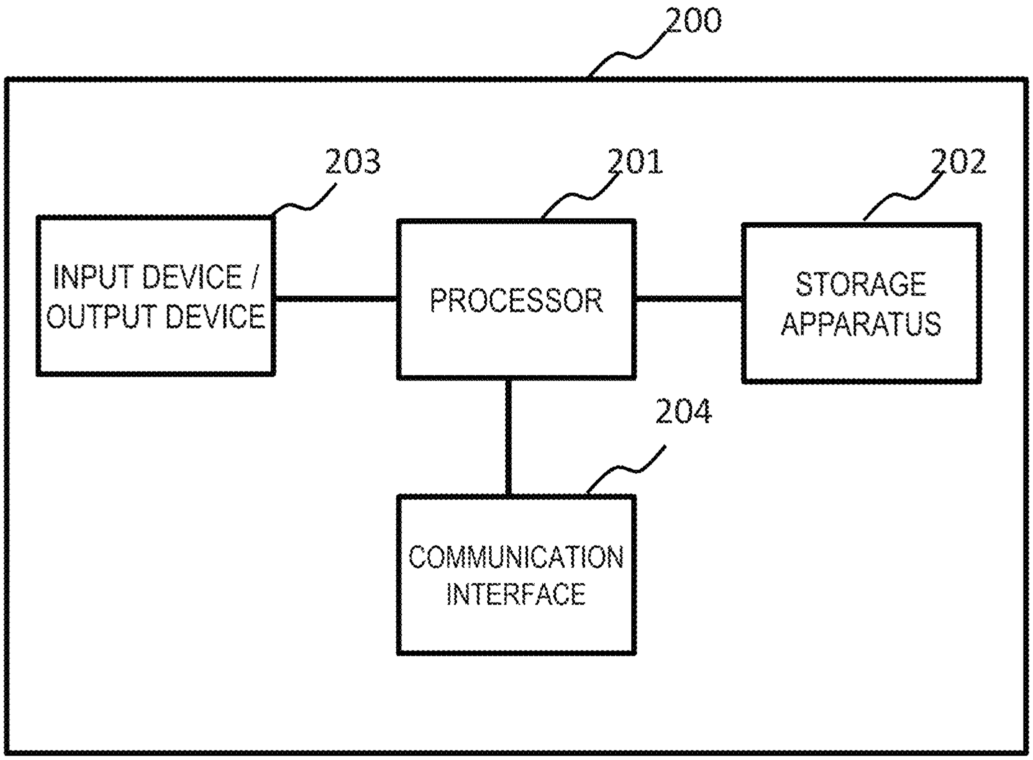
FIGS. 10A and 10B are schematic diagrams illustrating computer implementation examples.
Figure 10B:
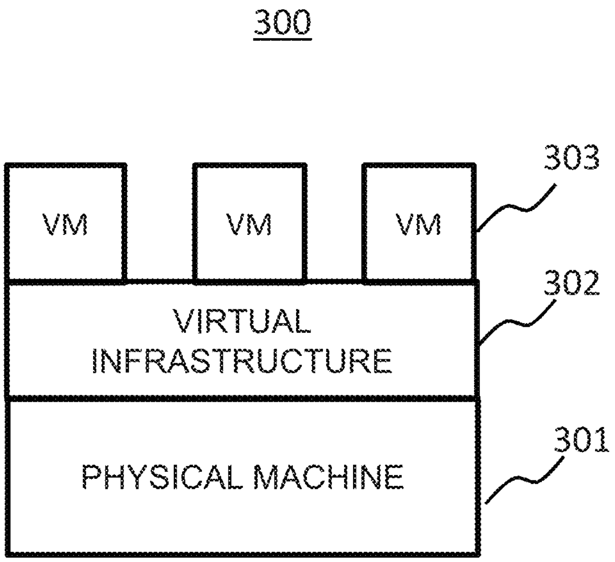

FIGS. 10A and 10B are schematic diagrams illustrating one of examples in which at least one of the apparatuses (110, 120, 130, and 140 in FIG. 4) in the above digital signature system 100 is implemented on a computer that has communication functions to communicatively connect to each other via a network. In FIG. 10A, at least one of the apparatuses (110, 120, 130, and 140) includes a processor 201, a storage apparatus (memory) 202, an input/output apparatus 203, and a communication interface 204. The storage apparatus 202 may include a semiconductor storage such as a RAM (Random Access Memory), a ROM (Read Only Memory), or EEPROM (Electrically Erasable and Programmable ROM), a HDD (Hard Disk Drive), a CD (Compact Disc), a DVD (Digital Versatile Disc), etc. The processor 201 executes a program(s) (not shown) stored in the storage apparatus (memory) 202 to implement processing and functions of each apparatus. The input/output apparatus 203 may include a keyboard and display. For example, the key-based signature generation apparatus 120 may be configured to output a verification result (acceptance or rejection) sent from the verification apparatus 140 on an output apparatus such as a display. In the key generation apparatus 110 and/or the key-based signature generation apparatus 120, each of which acquire biometric information, the input/output apparatus 203 may include a sensor to acquire biometric information. The sensor may include an image sensor (camera) if the biometric information include information on a face, iris, etc., a fingerprint sensor if the biometric information is a fingerprint, or a LED (Light Emitting Diode) that emits near-infrared light and a near-infrared camera that captures light transmitted through the finger, for example, in case of finger/palm veins. The sensor may be a removable sensor, such as a Universal Serial Bus (USB) apparatus. The communication interface 204 may include a network interface card, a transceiver, etc., and may be configured to communicate via a LAN (Local Area Network), a WAN (Wide Area Network) such as the Internet, a wireless LAN, a mobile communication network, etc. In the key generation apparatus 110, and/or the key-based signature generation apparatus 120, the communication interface 204 may be configured to have a n interface that communicatively connects to an external sensor (e.g., a sensor connected through Bluetooth (registered trademark), etc.) and receives biometric information acquired by the external sensor. A program(s) may be distributed to at least one of the apparatuses (110, 120, 130, and 140) from a program repository not shown.

FIG. 10B schematically illustrates an example of implementing at least one of the apparatuses (110, 120, 130, and 140 in FIG. 4) in the digital signature system 100 described above as virtual machines using server virtualization technology. A plurality of virtual machines VMs 303 are able to run on a virtual infrastructure 302 such as a hypervisor implemented on a physical machine 301 of a server 300. One or more of the apparatuses (110, 120, 130, and 140) in the digital signature system 100 may be implemented as a virtual machine(s) VM(s) 303, which may provide a virtual server environment with a plurality of virtual servers running, while physically a single server. Each virtual machine VM 303 is preferably configured to operate in an isolated environment in a memory space. In the virtual machine VM 303, the program that realizes processing of one of the apparatuses (110, 120, 130, and 140) runs on a virtual OS (Operating System) on the virtual machine VM. The virtual machine VM that virtually realizes any of the apparatuses (110, 120, 130, and 140) may be configured to communicatively connect with other virtual machines via a virtual network, or it may be configured to communicate and connect with other apparatus(es) among the apparatuses (110, 120, 130, and 140) through a physical interface (communication interface) of the physical machine 401 via a LAN, WAN such as the Internet, etc.

The first biometric information w and the second biometric information w' may be a binary vector, a real valued vector, or an integer vector.

In the above disclosure, example systems that perform processing based on biometric information are described, but the present disclosure is not limited to biometric information. The present disclosure is applicable to implement such a system using fuzzy information other than biometric information. For example, each aspect/example/embodiment described in the present disclosure may be applied to PUF (Physically Unclonable Function), etc. PUF may be used to identify a semiconductor apparatus (IC (Integrated Circuit) chip) and is a technology that uses individual differences that occur in a manufacturing process of IC chips, etc. to identify individuals (IC chips) like human fingerprints, for example.

The above examples/embodiments of the present disclosure may partially or entirely be described as the following Supplementary notes (Notes), though not limited thereto.

(Note 1) A digital signature system includes a first signature generation apparatus and a second signature generation apparatus, each including at least a processor, a memory storing program instructions executable by the processor and a communication interface and communicatively connecting to each other, wherein the first signature generation apparatus is configured to receive first auxiliary data generated based on a first signature key and first biometric information to store the first auxiliary data in a storage, wherein the second signature generation apparatus is configured to:

acquire second biometric information;

generate a second distributed key;

acquire a message to be signed;

generate second auxiliary data using the second biometric information and the second distributed key; and transmit the message and the second auxiliary data to the first signature generation apparatus, wherein the first signature generation apparatus is configured to on reception of the second auxiliary data, generate a first distributed key using the first auxiliary data and the second auxiliary data, and wherein the first signature generation apparatus and the second signature generation apparatus are configured to perform a distributed signing process using at least the first distributed key and the second distributed key to generate a signature for the message.

(Note 2) In the digital signature system of Note 1, the first auxiliary data is composited by an encoded value of the signature key and the first biometric information. The second auxiliary data is composited by an encoded value of the second distributed key and the second biometric information, with the same operation as that used for composition of the first auxiliary data.

(Note 3) In the digital signature system of Note 1 or 2, the first signature generation apparatus generates the first distributed key by decoding a difference between the first auxiliary data and the second auxiliary data.

(Note 4) In the digital signature system of any one of Notes 1 to 3, in the distributed signing process performed by the first signature generation apparatus and the second signature generation apparatus, the signature is generated by using, as a signature key, a sum of the first distributed key and the second distributed key. The first signature generation apparatus or the second signature generation apparatus transmits the signature generated by the distributed signing process to a signature verification destination.

(Note 5) In the digital signature system of any one of Notes 1 to 4, in the distributed signing process, the second signature generation apparatus encrypts the second distributed key with a public key and transmits the encrypted second distributed key to the first signature generation apparatus, wherein the first signature generation apparatus acquires the message; receives the encrypted second distributed key;

by using a homomorphic cryptographic operation, with the encrypted second distributed key kept in an encrypted state, computes, according to an ECDSA algorithm, a value encrypted with the public key, of a part of a signature for the message to be generated using a sum of the first distributed key and the second distributed key; and transmits the encrypted value to the second signature generation apparatus, wherein the second signature generation apparatus, on reception of the encrypted value of the part of the signature generated by the first signature generation apparatus, decrypts the encrypted value of the part of the signature using a private key corresponding to the public key; and completes generation of the signature for the message using the decrypted value, according to the ECDSA algorithm.

(Note 6) In the digital signature system of any one of Notes 1 to 4, in the distributed signing process, the second signature generation apparatus is configured to generate a first random number (k1) as a parameter of a Schnorr signature algorithm; and transmits to the first signature generation apparatus, a first value (r1) obtained by multiplying a generator (g) in the Schnorr signature algorithm by the first random number (k1), wherein the first signature generation apparatus is configured to: acquire the message; generate a second random number (k2) as a parameter of the Schnorr signature algorithm; compute a second value (r2) by multiplying the generator (g) by the second random number (k2); using a third value (r=r1*r2) obtained by multiplying the second value (r2) by the first value (r1) and the message (M), obtain a first element (e=H(r,M)) of a first signature of the Schnorr signature algorithm; generate a second element (s') of the first signature of the Schnorr signature algorithm using the first random number (k2), the first element (e) and the first distributed key (x'); and transmit the second value (r2) and the second element (s') of the first signature to the second signature generation apparatus, wherein the second signature generation apparatus is configured to: obtain the first element (e) of the signature (σ) of the Schnorr signature algorithm using the message (M) and a value of the second value (r2) multiplied by the first value (r1); and compute a second element (s) of the signature (σ) of the Schnorr signature algorithm, using the second element (s') of the first signature, the first random number (k1), the second distributed key (Δ) and the first element (e) of the signature (σ), wherein the signature (σ) obtained by the second signature generation apparatus constitutes a signature for the message (M) generated using a signature key of a sum (x'+Δ) of the first distributed key (x') and the second distributed key (Δ).

(Note 7) In the digital signature system of any one of Notes 1 to 6, wherein a key generation apparatus provided with at least a processor and a communication interface, generates a first signature key and a verification key corresponding to the first signature key, acquires the first biometric information, generates the first auxiliary data using the first signature key and the first biometric information, and transmits the first auxiliary data to the first signature generation apparatus.

A verification apparatus provides with at least a processor and a communication interface, receives the signature from the first signature generation apparatus or the second signature generation apparatus, obtains a message from the first signature generation apparatus, and verifies correctness of a pair of the message and the first signature using a verification key.

(Note 8) In the digital signature system of Note 7, the key generation apparatus transmits the verification key to the first signature generation apparatus or the second signature generation apparatus.

The first signature generation apparatus or the second signature generation apparatus verifies correctness of the signature for the message using the verification key for the signature generated by the distributed signing process, and if a verification result of the signature is acceptance, the signature is transmitted to the verification apparatus.

(Note 9) A digital signature method includes:

a first node out of the first node and a second node communicatively connected to each other, receiving the first auxiliary data created using a first signature key and first biometric information for registration in a storage;

the second node, acquiring second biometric information;

generating a second distributed key;

acquiring a message to be signed;

generating second auxiliary data using the second biometric information and the second distributed key; and transmitting the message and the second auxiliary data to the first node, the first node generating a first distributed key using the first auxiliary data and the second auxiliary data, and the first node and the second node executing a distributed signing process using at least the first distributed key and the second distributed key to generate a signature for the message.

(Note 10) In the digital signature method of Note 9, the first auxiliary data is composited by the encoded value of the signature key and the first biometric information. The second auxiliary data is composited by the value of the first distributed key encoded by the encoding function and the second biometric information, with the same operation as that used for composition of the first auxiliary data.

(Note 11) In the digital signature method of Note 9 or 10, the first node generates the second distributed key by decoding a difference between the first auxiliary data and the second auxiliary data.

(Note 12) In the digital signature method of any one of Notes 9 to 11, in the distributed signing process performed by the first node and the second node, the signature is generated by using a sum of the first distributed key and the second distributed key as the signature key The first node or the second node transmits the signature generated by the distributed signing process to a signature verification destination.

(Note 13) A non-transitory recording medium storing programs for a first processing apparatus and a second processing apparatus communicatively connected to each other, the first processing apparatus executes the program to receive and register first auxiliary data created using a first signature key and first biometric information in a storage, the second processing apparatus executes the program to:

acquire the second biometric information;

generate a second distributed key;

acquire a message to be signed;

generate second auxiliary data from the second biometric information and the second distributed key; and transmit the message and the second auxiliary data to the first processing apparatus.

The first processing apparatus executes the program to generate the first distributed key using the first auxiliary data and the second auxiliary data.

The first processing apparatus and the second processing apparatus execute the programs to perform a distributed signing process using at least the first distributed key and the second distributed key to generate a signature for the message.

(Note 14) In the non-transitory recording medium of Note 13, the first auxiliary data is a composited by the encoded value of the signature key and the first biometric information.

The second auxiliary data is composited by the value of the first distributed key encoded by the encoding function and the second biometric information, with the same operation as that used for composition of the first auxiliary data.

(Note 15) In the non-transitory recording medium of Note 13 or 14, the first processing apparatus executes the program to generate the second distributed key by decoding the difference between the first auxiliary data and the second auxiliary data.

(Note 16) In the non-transitory recording medium of any one of Notes 13 to 15, in the distributed signing process performed by the first processing apparatus and the second processing apparatus, the signature is generated by using a sum of the first distributed key and the second distributed key as a signature key, and the first processing apparatus or the second processing apparatus transmits the signature generated by the distributed signing process to a signature verification destination.

[Reference Literature 1] Lindell, Yehuda. "Fast secure two-party ECDSA signing." Advances in Cryptology—CRYPTO 2017: 37th Annual International Cryptology Conference, Santa Barbara, CA, USA, Aug. 20-24, 2017, Proceedings, Part II 37. Springer International Publishing, 2017

[Reference Literature 2] Dodis, Yevgeniy/Ostrovsky Rafail/Reyzin, Leonid/Smith, Adam. "Fuzzy Extractors: How to Generate Strong Keys from Biometrics and Other Noisy Data.", EUROCRYPT 2004.

[Reference Literature 3] Nicolosi, Antonio, et al. "Proactive Two-Party Signatures for User Authentication."

[Reference Literature 4] Derler, David/Slamanig, Daniel. "Key-homomorphic signatures: definitions and applications to multiparty signatures and non-interactive zero-knowledge." Designs, Codes and Cryptography, Vol. 87.

[Reference Literature 5] Japanese Patent Publication No. 2021-087167

The disclosure of each of patent literature 1 and reference literatures is incorporated herein by reference thereto. Variations and adjustments of the examples are possible within the scope of the overall disclosure (including the claims) based on the basic technical concept. Various combinations and selections of examples and disclosed elements (including the elements in each of the claims, examples, drawings, etc.) are possible within the scope of the claims of the present application. That is, the present disclosure includes various variations and modifications that could be made by those skilled in the art according to the overall disclosure including the claims and the technical concept.

What is claimed is:

1. A digital signature system comprising:

a first signature generation apparatus and a second signature generation apparatus, each including at least a processor, a memory storing program instructions executable by the processor and a communication interface and communicatively connecting to each other, wherein the first signature generation apparatus is configured to receive first auxiliary data generated based on a first signature key and first biometric information to store the first auxiliary data in a storage, wherein the second signature generation apparatus is configured to:

acquire second biometric information;

generate a second distributed key;

acquire a message to be signed;

generate second auxiliary data using the second biometric information and the second distributed key; and transmit the message and the second auxiliary data to the first signature generation apparatus, wherein the first signature generation apparatus is configured to on reception of the second auxiliary data, generate a first distributed key using the first auxiliary data and the second auxiliary data, and wherein the first signature generation apparatus and the second signature generation apparatus are configured to perform a distributed signing process using at least the first distributed key and the second distributed key to generate a signature for the message.

2. The digital signature system according to claim 1, wherein the first auxiliary data is composited by an encoded value of the signature key and the first biometric information, and wherein the second auxiliary data is composited by an encoded value of the second distributed key and the second biometric information, with a composite operation thereof being same as that of the first auxiliary data.

3. The digital signature system according to claim 1, wherein the first signature generation apparatus generates the first distributed key by decoding a difference between the first auxiliary data and the second auxiliary data.

4. The digital signature system according to claim 1, wherein in the distributed signing process performed by the first signature generation apparatus and the second signature generation apparatus, the signature is generated by using, as a signature key, a sum of the first distributed key and the second distributed key, the first signature generation apparatus or the second signature generation apparatus transmitting the signature generated by the distributed signing process to a signature verification destination.

5. The digital signature system according to claim 1, wherein in the distributed signing process, the second signature generation apparatus encrypts the second distributed key with a public key and transmits the encrypted second distributed key to the first signature generation apparatus, wherein the first signature generation apparatus acquires the message;

receives the encrypted second distributed key;

by using a homomorphic cryptographic operation, with the encrypted second distributed key kept in an encrypted state, computes, according to an Elliptic Curve Digital Signature Algorithm (ECDSA) algorithm, a value encrypted with the public key, of a part of a signature for the message to be generated using a sum of the first distributed key and the second distributed key; and transmits the encrypted value to the second signature generation apparatus, wherein the second signature generation apparatus, on reception of the encrypted value of the part of the signature generated by the first signature generation apparatus, decrypts the encrypted value of the part of the signature using a private key corresponding to the public key; and completes generation of the signature for the message using the decrypted value, according to the ECDSA algorithm.

6. The digital signature system according to claim 1, wherein in the distributed signing process, the second signature generation apparatus is configured to generate a first random number (k1) as a parameter of a Schnorr signature algorithm; and transmit to the first signature generation apparatus, a first value (r1) obtained by multiplying a generator (g) in the Schnorr signature algorithm by the first random number (k1), wherein the first signature generation apparatus is configured to:

acquire the message;

generate a second random number (k2) as a parameter of the Schnorr signature algorithm;

compute a second value (r2) by multiplying the generator (g) by the second random number (k2);

using a third value (r=r1*r2) obtained by multiplying the second value (r2) by the first value (r1) and the message (M), obtain a first element (e=H (r, M)) of a first signature of the Schnorr signature algorithm;

generate a second element (s') of the first signature of the Schnorr signature algorithm using the first random number (k2), the first element (e) and the first distributed key (x'); and transmit the second value (r2) and the second element (s') of the first signature to the second signature generation apparatus, wherein the second signature generation apparatus is configured to:

obtain the first element (e) of the signature (σ) of the Schnorr signature algorithm using the message (M) and a value of the second value (r2) multiplied by the first value (r1); and compute a second element(s) of the signature (σ) of the Schnorr signature algorithm, using the second element (s') of the first signature, the first random number (k1), the second distributed key (Δ) and the first element (e) of the signature (σ), wherein the signature (σ) obtained by the second signature generation apparatus constitutes a signature for the message (M) generated using a signature key of a sum (x'+Δ) of the first distributed key (x') and the second distributed key (Δ).

7. The digital signature system according to claim 1, further comprising a key generation apparatus including at least a processor, a memory storing program instructions executable by the processor and a communication interface; and a verification apparatus including at least a processor, a memory storing program instructions executable by the processor and a communication interface, wherein the key generation apparatus is configured to:

generate a first signature key and a verification key corresponding to the first signature key;

acquire the first biometric information;

generate the first auxiliary data using the first signature key and the first biometric information; and transmit the first auxiliary data to the first signature generation apparatus, and wherein the verification apparatus is configured to:

receive the signature from the first signature generation apparatus or the second signature generation apparatus;

acquire the message from the first signature generation apparatus; and verify correctness of the signature for the message using a verification key.

8. The digital signature system according to claim 7, wherein the key generation apparatus transmits the verification key to the first signature generation apparatus or the second signature generation apparatus, and wherein the first signature generation apparatus or the second signature generation apparatus verifies, using the verification key, correctness of the signature for the message generated by the distributed signing process and when the signature is accepted, transmits the signature to the verification apparatus.

9. A digital signature method comprises:

a first node receiving first auxiliary data generated based on a first signature key and first biometric information and storing the first auxiliary data in a storage;

a second node that communicatively connects to the first node, acquiring second biometric information;

generating a second distributed key;

acquiring a message to be signed;

generating second auxiliary data using the second biometric information and the second distributed key; and transmitting the message and the second auxiliary data to the first node;

the first node generating a first distributed key using the first auxiliary data and the second auxiliary data; and the first node and the second node executing a distributed signing process using at least the first distributed key and the second distributed key to generate a signature for the message.

10. The digital signature method according to claim 9, wherein the first auxiliary data is composited by an encoded value of the signature key and the first biometric information, the method comprising the second node generating the second auxiliary data by compositing an encoded value of the second distributed key and the second biometric information, with a composite operation thereof being same as that of the first auxiliary data.

11. The digital signature method according to claim 9, comprising the first node generating the first distributed key by decoding a difference between the first auxiliary data and the second auxiliary data.

12. The digital signature method according to claim 9, wherein the distributed signing process performed by the first node and the second node generates the signature using, as the signature key, a sum of the first distributed key and the second distributed key, the first node or the second node transmitting the signature generated by the distributed signing process to a signature verification destination.

13. The digital signature method according to claim 9, wherein the distributed signing process includes:

the second node encrypting the second distributed key with a public key and transmitting the encrypted second distributed key to the first node;

the first node acquiring the message;

the first node, by using a homomorphic cryptographic operation, with the encrypted second distributed key kept in an encrypted state, computing, according to an Elliptic Curve Digital Signature Algorithm (ECDSA) algorithm, a value encrypted with the public key, of a part of a signature for the message to be generated using a sum of the first distributed key and the second distributed key;

the first node transmitting the encrypted value to the second node;

the second node, on reception of the encrypted value of the part of the signature generated by the first node;

the second node decrypting the encrypted value of the part of the signature using a private key corresponding to the public key; and the second node completing generation of the signature using the decrypted value according to the ECDSA algorithm.

14. The digital signature method according to claim 9, further comprising a third node communicatively connecting to the first node, generating a first signature key and a verification key corresponding to the first signature key;

the third node acquiring the first biometric information;

the third node generating the first auxiliary data using the first signature key and the first biometric information; and the third node transmitting the first auxiliary data to the first node;

a fourth node communicatively connecting to the first node or the second node, receiving the signature from the first node or the second node;

the fourth node acquiring the message from the first node; and the fourth node verifying correctness of the signature for the message using a verification key.

15. A non-transitory recording medium storing a program for a first processing apparatus and a second processing apparatus communicatively connected to each other, the program including a first program causing the first processing apparatus to execute:

receiving and storing first auxiliary data created using a first signature key and first biometric information in a storage, a second program causing the second processing apparatus to execute:

acquiring the second biometric information;

generating a second distributed key;

acquiring a message to be signed;

generating second auxiliary data using the second biometric information and the second distributed key; and transmitting the message and the second auxiliary data to the first processing apparatus, a third program causing the first processing apparatus to execute generating the first distributed key using the first auxiliary data and the second auxiliary data, and further programs causing the first processing apparatus and the second processing apparatus to execute performing a distributed signing process using at least the first distributed key and the second distributed key to generate a signature for the message.

16. The non-transitory recording medium according to claim 15, wherein the first auxiliary data is composited by an encoded value of the signature key and the first biometric information, and wherein the second auxiliary data is composited by an encoded value of the second distributed key and the second biometric information, with a composite operation thereof being same as that of the first auxiliary data.

17. The non-transitory recording medium according to claim 15, wherein the first processing apparatus executes the third program to generate the first distributed key by decoding a difference between the first auxiliary data and the second auxiliary data.

* * * * *